(12) United States Patent
Clement et al.

(10) Patent No.: US 7,380,878 B2
(45) Date of Patent: Jun. 3, 2008

(54) COMPACT FOLDING SEAT

(75) Inventors: David Clement, Colorado Springs, CO (US); Russell Berger, Needham, MA (US)

(73) Assignee: SKJP Holdings, LLC, Naples, FL (US)

( * ) Notice: Subject to any disclaimer, the term of this patent is extended or adjusted under 35 U.S.C. 154(b) by 0 days.

(21) Appl. No.: 11/064,120

(22) Filed: Feb. 22, 2005

(65) Prior Publication Data
US 2005/0264065 A1   Dec. 1, 2005

Related U.S. Application Data

(60) Provisional application No. 60/575,295, filed on May 28, 2004.

(51) Int. Cl.
*A47C 15/00* (2006.01)
*A47C 1/08* (2006.01)
*A47D 1/10* (2006.01)

(52) U.S. Cl. ............... 297/256.13; 297/256.1; 297/255

(58) Field of Classification Search ........ 297/256, 297/256.13, 250.1, 335, 331, 332, 452.18, 297/255
See application file for complete search history.

(56) References Cited

U.S. PATENT DOCUMENTS

| 1,399,835 A * | 12/1921 | Willems ............... 297/49 |
| 2,349,092 A | 5/1944 | Hammer ............... 155/79 |
| 2,971,570 A | 2/1961 | Bush ............... 155/148 |
| 3,220,769 A | 11/1965 | Regan |
| 3,669,492 A * | 6/1972 | Peterson ............... 297/253 |
| 4,521,052 A | 6/1985 | Cone ............... 297/3 |
| 4,541,654 A | 9/1985 | Jonasson |
| 4,768,827 A | 9/1988 | Musgrove ............... 297/236 |
| 4,902,070 A | 2/1990 | Casale et al. ............... 297/238 |
| 5,121,965 A * | 6/1992 | Skold et al. ............... 297/256.1 |
| 5,265,931 A | 11/1993 | Ryan |
| 5,286,086 A | 2/1994 | Gunji ............... 297/250.1 |
| 5,310,242 A * | 5/1994 | Golder ............... 297/14 |
| 5,366,271 A | 11/1994 | Johnston et al. ............... 297/250.1 |
| 5,378,038 A * | 1/1995 | Koyanagi et al. ............... 297/256.13 |

(Continued)

FOREIGN PATENT DOCUMENTS

DE   102498   7/1898

(Continued)

*Primary Examiner*—David R. Dunn
*Assistant Examiner*—Tania Abraham
(74) *Attorney, Agent, or Firm*—Barlow, Josephs & Holmes, Ltd.

(57) ABSTRACT

The unique folding child vehicle seat (10) includes a seat back member (12) and a seat bottom member (14) that is pivotally connected thereto. The seat bottom (14) is pivotally connected to the seat back (12) in the unique location of a selected distance from the bottom edge of the seat back member. A support member (42) is provided proximal to the bottom edge of the seat back (12). The seat bottom member (14) is pivotable between a closed position where the lower surface of the seat bottom member (14) rests on the support member (42) to provide a unique cantilevered seat configuration. Vertically oriented plates (32a, 32b, 34a, 34b) provide an internal framework for added strength. Also, the seat (10) may be of a non-folding configuration where L-shaped vertically oriented plates (202a, 202b) provide the internal framework.

114 Claims, 21 Drawing Sheets

U.S. PATENT DOCUMENTS

| | | | |
|---|---|---|---|
| 5,395,154 A * | 3/1995 | Wang | 297/130 |
| 5,478,096 A | 12/1995 | Ting | 280/30 |
| 5,527,094 A * | 6/1996 | Hiramatsu et al. | 297/250.1 |
| 5,580,125 A | 12/1996 | Alger | 297/250.1 |
| 5,785,383 A | 7/1998 | Otero | 297/255 |
| 5,803,543 A * | 9/1998 | Hartmann | 297/256 |
| 5,915,787 A | 6/1999 | Brookman | 297/256.13 |
| 5,997,085 A | 12/1999 | MacLiver | |
| 6,220,662 B1 * | 4/2001 | Franco-Vila et al. | 297/256.13 |
| 6,447,060 B1 | 9/2002 | Vila et al. | |
| 6,474,741 B2 * | 11/2002 | Kamida et al. | 297/378.12 |
| 6,568,755 B1 * | 5/2003 | Groening | 297/256.13 |
| 6,578,919 B2 * | 6/2003 | Seibold et al. | 297/331 |
| 6,916,057 B2 * | 7/2005 | Teich | 296/65.08 |
| 2004/0061355 A1 | 4/2004 | Meeker et al. | |
| 2004/0061366 A1 * | 4/2004 | Meeker et al. | 297/250.1 |

FOREIGN PATENT DOCUMENTS

| | | |
|---|---|---|
| DE | 10211498 C1 | 11/2003 |
| JP | 2000343993 | 12/2000 |
| WO | 0206091 A2 | 1/2002 |

* cited by examiner

COMPACT FOLDING SEAT

CROSS-REFERENCE TO RELATED APPLICATIONS

This application claims priority from prior U.S. Provisional Application Ser. No. 60/575,295 filed on May 28, 2004.

BACKGROUND OF THE INVENTION

This invention relates generally to automobile seats, and more specifically to a child or infant seat for automobiles and other moving vehicles. More specifically, the present invention relates to child car seats that are foldable, lightweight and, therefore, easily portable.

It is well known in the transportation industry that vehicle seats, such as automobile seats, installed in a vehicle does not provide adequate safety for children, particularly very young infants. These vehicle seats are typically designed to contain adults due to their size and configuration. For example, the overall size of the seat and the location of the safety belts therein are designed for bodies of an adult size. When a child sits in such an adult vehicle seat, the child is not adequately contained and the safety belts are poorly positioned on the child's body. Thus, the child can easily slip under a belt during an accident thereby risking injury. In summary, a child riding in an adult vehicle seat is extremely unsafe.

Numerous devices have been proposed for enhancing the safety for children while driving in automobiles. While seat belts have provided some measure of safety for older children, separate smaller seats have generally been used for young children and infants since these tend to restrain the child from movement in almost every direction. Also, the harness seat belts of these child car seats can be positioned in the proper location about the child.

In most instances, these child car seats have been separate seats which can be installed on an adult automobile seat and secured in some fashion thereto by means of, for example, the adult seat belts. In newer automobiles, mounting structures are provided to connect the seat directly to the chassis of the vehicle. These child car seats have been found to be very effective in protecting the child when in a vehicle that has only adult-sized seats installed therein.

Child car seats in the prior art are known to be provided in two primary configurations. Most common are non-folding child car seats where the body of the seat is of a unitary construction. The seat is typically made of plastic with a cushioning thereon. The overall shape of the seat is fixed into a general L-shaped configuration. Frequently, certain styles of these fixed, non-folding child car seats can also receive a handle for easier portability. Appropriate structures are provided on the seat to secure it to the adult vehicle seat onto which it is installed. U.S. Pat. No. 5,286,086, issued to Gunji, is an example of such a construction.

Due to the unitary construction, the non-folding fixed child car seats of the prior art are very safe in that they are rigid structures that are not apt to collapse during an accident. This is a serious concern in aftermarket add-on seats within a vehicle. Also, the very unitary non-folding construction is also highly undesirable because it is very bulky during travel without the child or for storage, for example in the trunk of a vehicle when not in use. Therefore, in these non-folding child seats of the prior art, there is a trade off between the safety of the rigid non-folding design with portability and compactness to facilitate transport of the seat.

To address the shortcomings of the prior unitary fixed child vehicle seats, there have been attempts in the prior art to provide a folding child car seat. These prior art seats typically include a seat back and a seat bottom that are pivotally connected to each in some way. When in use, the seat back and the seat bottom are located in an open position relative to one another to form the desired seat configuration. When not in use, the seat bottom and seat back are pivoted relative to one another so that the seat can collapse whereby the seat bottom and the seat back are proximal to one another. U.S. Pat. No. 5,803,543, issued to Hartmann, is a good example of this known construction.

The folding child vehicle seats of the prior art are more compact and portable than the non-folding seat discussed above because they fold. However, the presence of a pivot break point introduces a structural weakness in the construction of the seat. More specifically, the pivot point that hingedly connects the seat back to the seat bottom creates a stress point that is of particular concern from a safety perspective. Thus, the prior art folding seats must provide the appropriate locking mechanism to secure the hinged connection in its open condition during use. It is critical that satisfactory locking is provided to ensure that the seat does not fold up and collapse during an accident.

Prior art folding vehicle seats address this problem in a number of different ways. For example, locking mechanisms have been provided in the prior art directly about the pivot point between the seat back and the seat bottom. In this case, retractable pins or tabs have been used to engage with slots on the pivot structure to releasbly lock the seat in a desired open or closed condition. These pivot locks are susceptible to failure because most of the load during an accident is focused on the pivot point of the seat. Also, cross-struts have been used to secure the seat in an open condition, however, these struts are cumbersome and uncomfortable for the child when in operation.

Also, while prior art foldable child car seats do collapse to a smaller overall shape than non-folding seats to facilitate transport, they are still quite bulky even when in a closed condition. This is due to the nature and configuration of how they collapse, such as the location and nature of the pivot hinge. Also, the amount of folding is limited because the thickness of the seat bottom impacts into the thickness of the seat back. Thus, the overall thickness of the folded seat is the thickness of the seat back plus the thickness of the seat bottom. Some child seats have very thin seat backs and seat bottoms to provide a compact overall folded configuration, however, the reduced thickness and padding has a negative impact on the safety of the seat when in use.

The child car seats of the prior art suffer from various disadvantages that make them unsafe or cumbersome to use. Therefore, there is a need for a child car seat to be safe and comfortable to use. There is a further need for a child car seat to be compact and transportable while being safe. There is a particular need for compact folding child vehicle seat that safely stays open even during the impact of an accident.

SUMMARY OF THE INVENTION

The present invention preserves the advantages of prior art folding seats, such as folding child car seats. In addition, it provides new advantages not found in currently available seats and overcomes many disadvantages of such currently available seats.

The invention is generally directed to a novel and unique folding child car seat that includes a seat back member and a seat bottom member that is pivotally connected thereto. The seat bottom is pivotally connected to the seat back in the unique location of a selected distance from the bottom edge of the seat back member. A support member is provided proximal to the bottom edge of the seat back and at a distance from a front face of the seat member. The seat bottom member is pivotable between a closed position with the first surface of the seat bottom member being in close proximity to the front face of the seat back member and an open position with the second surface of the seat bottom member being in communication with the support member to provide a unique cantilevered seat configuration.

Also, the folding seat of the present invention includes a first array of vertically oriented plate members in spaced apart relation to one another forming a seat back frame having a bottom end with a support surface thereon and a top end. A second array of vertically oriented plate members in spaced apart relation to one another form a seat bottom frame. These plate members are preferably made of steel, but could be made of other metal and non-metal materials as well that are suitable for frame members and bearing loads.

Vertically oriented plates can support large loads utilizing less material when positioned in this fashion which is unique to the present invention. Since the load of the seat is borne in the direction of the vertically oriented plate, it is much stronger because it is this greater thickness of the plate that is resisting flexing due to the presence of the load. Thus, the load bearing ability of the frame is greatly improved with less material weight when the plates therein are oriented on their ends in a vertical fashion.

The seat bottom frame is pivotally connected to the seat back frame at a location between the bottom end and the top end. The support surface of the bottom end being a pivot stop thereby defines an open condition of the seat bottom frame relative to the seat back frame and complete pivoting of the seat bottom frame toward the seat back frame thereby defines a closed condition. The side armrests of the seat bottom compactly nest within apertures or recesses in the seat back when the seat is in its folding condition.

During folding, the vertical plates are allowed to pass through the front surface(s) of the seat. This feature means that the plates can be designed in a more linear shape for greater strength with less material and in the folded condition of the seat, there can be a closer proximity of the seat back plates and seat bottom plates to each other, for a lighter weight and strongly supported seat that has a thin folded profile.

The present invention addresses all of the problems associated with the prior art by providing a compact folding seat that has a unique cantilevered construction coupled with a structure to receive the side arm rests of a seat bottom. As a result, the compact folding seat of the present invention is much more secure than prior art folding seats and will not collapse during an accident while being extremely compact and light in weight. In view of the foregoing, the folding seat of the present invention is more safe and more compact than prior art folding seats.

It is therefore an object of the present invention to provide a folding child car seat.

It is an object of the present invention to provide a folding child car seat that is safe, secure and will not collapse during an accident.

It is a further object of the present invention to provide a folding child car seat that is extremely compact.

Another object of the present invention is to provide a folding child car seat that is easy to operate.

It is a further object of the present invention to provide a child car seat that is lightweight yet safe and secure.

Another object of present invention is to provide a child car seat that is comfortable for a child to use.

Another object of the present invention is to provide a child car seat that can fold quickly and easily.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
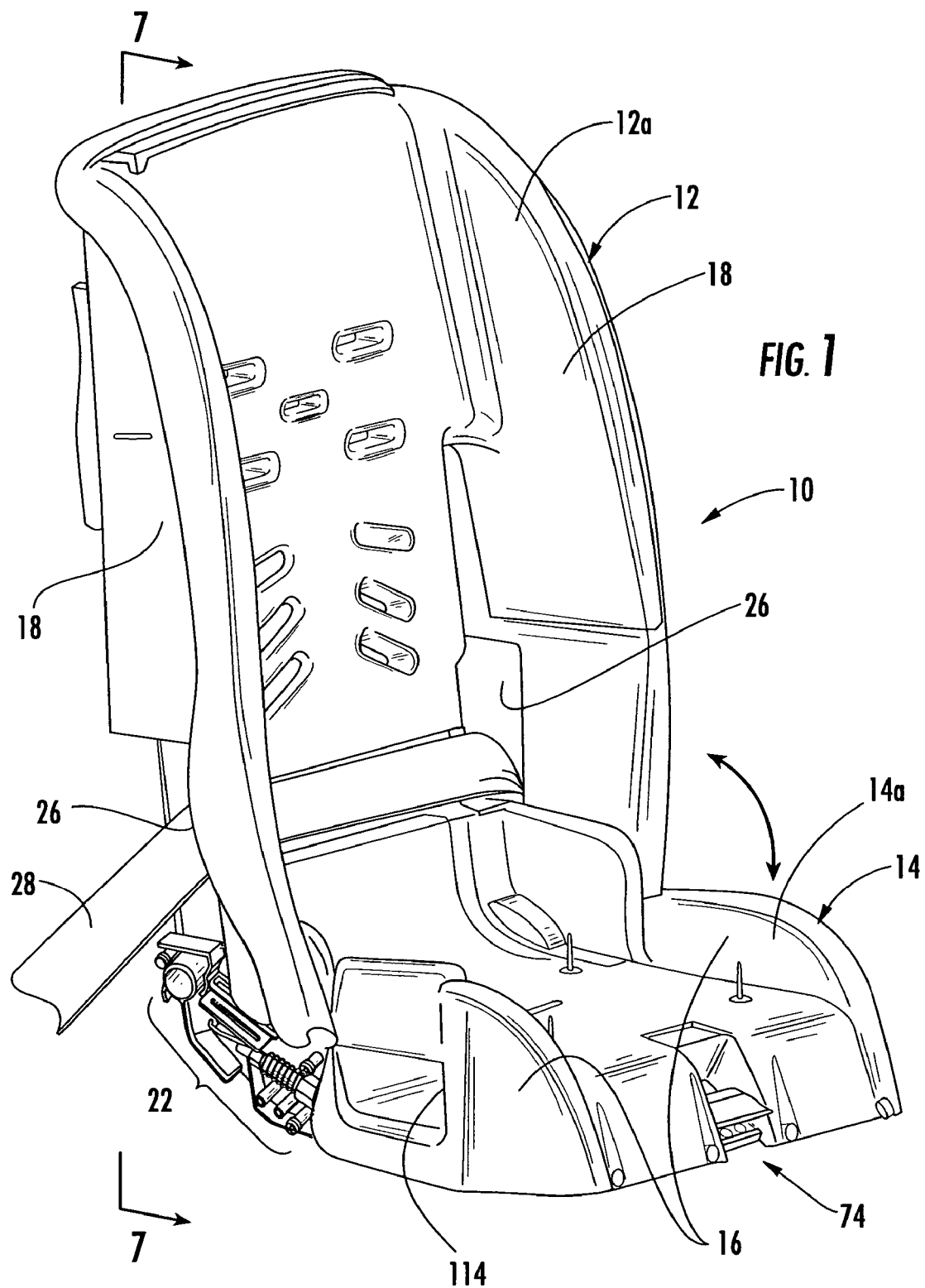
FIG. 1 is a partial cut-away perspective view of the folding child vehicle seat of the present invention in an open condition.

Referring first to FIG. 1, a partial cut-away perspective view of the folding child vehicle seat 10 of the present invention. The seat 10 includes a seat back 12 and a seat bottom 14 pivotally connected thereto. This enables the seat bottom 14 to fold up to the seat back 12, as indicated by the arrow.

In general, the seat of the present invention includes a frame structure, as will be described below, and housing 12a installed thereon to give the seat 10a desired ergonomic seat. The housing 12a for the seat back 12 is in the form of a seat cover while the seat bottom 14 also includes a similar housing or cover 14a thereon. The covers 12a and 14a can be made out of any material but are preferably made of injection molded plastic. These covers 12a and 14a are shown in a given ergonomic shape but any desired shape and size can be employed and still be within the scope of the present invention. It is preferred to employ well known child vehicle seat configurations which are generally accepted to meet government standards. For example, side arm rests 16 on the seat bottom 14 and side panels 18 on the seat back 12 are preferably included. However, these structures are optional. Also, various sizes of the seat 10 of the present invention can be provided to accommodate children of different sizes and ages.

Figure 21:
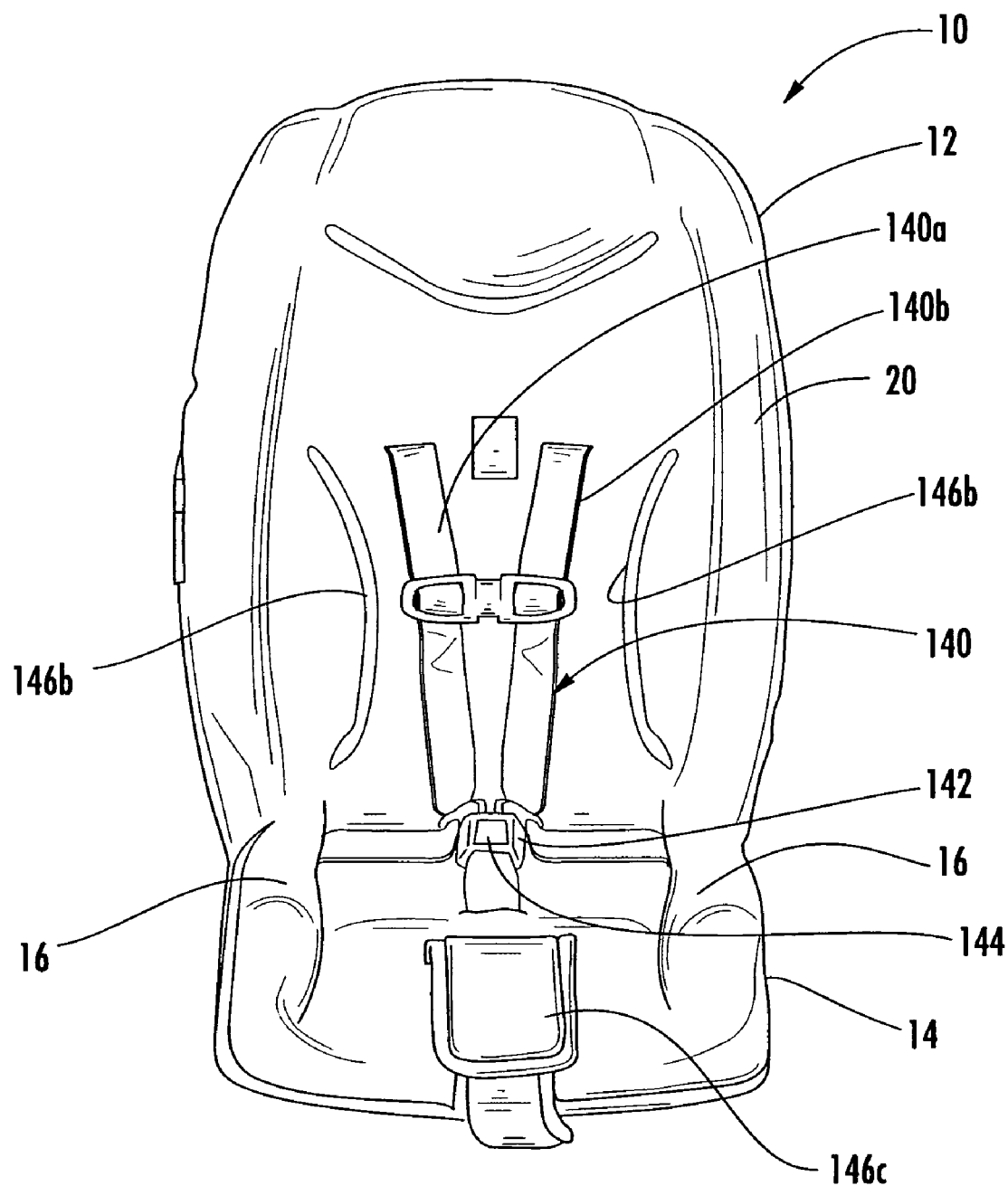
FIG. 21 is a front perspective view of the folding car seat of the present invention full padding and cushioning thereon.

Additional padding, as seen in FIG. 21 below, is preferably added on top of the outer housings 12a and 14a to provide additional cushioning for a child sitting therein.

Figure 4:
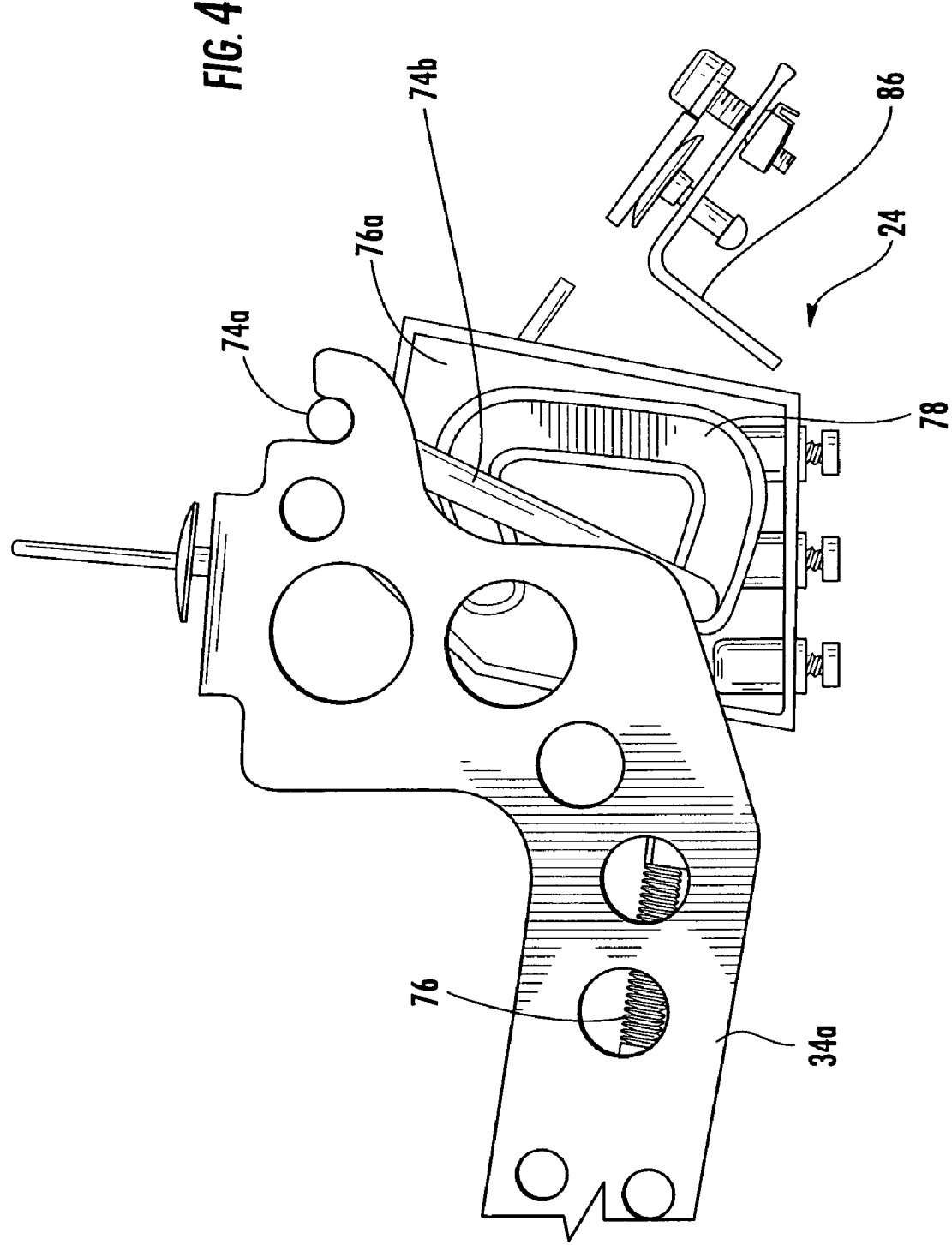
FIG. 4 is a side elevational view of the height adjustment mechanism of the present invention.
Figure 5:
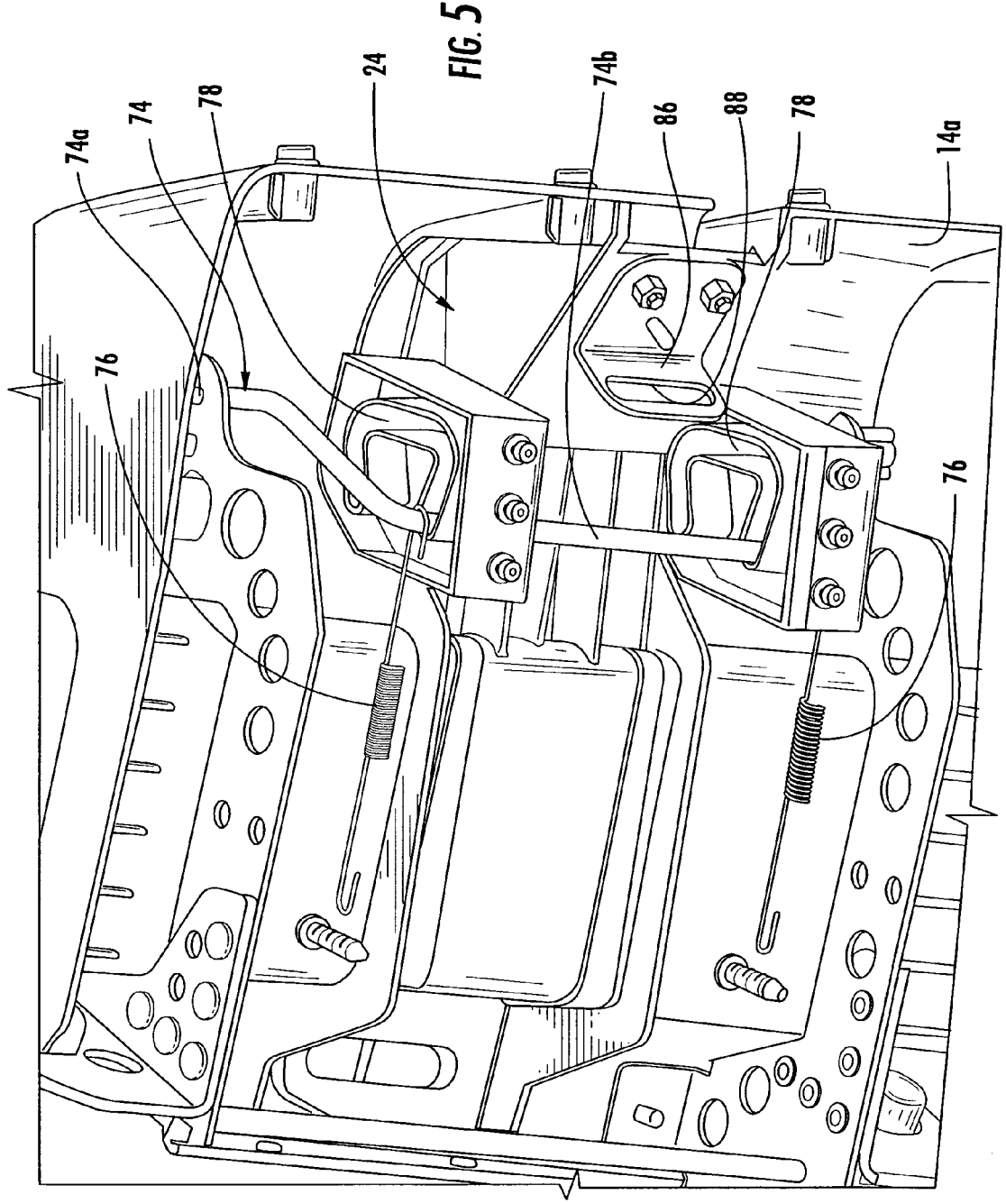
FIG. 5 is a bottom perspective view of the height adjustment mechanism of the present invention.

For ease of illustration, the folding child vehicle seat 10 is shown without the cushioning 20 of FIG. 21, but it should be understood that any desired cushioning 20, in the form of foam rubber, fabric and the like and combinations thereof, may be employed to provide an interface between the seat 10 and the child sitting therein. The seat 10 also includes a locking mechanism 22 and a height adjustment mechanism 24, as best seen in FIGS. 4 and 5, which will be described in detail below. Also, as seen in FIG. 1, pass through apertures 26 in the housing 12a of the seat back 12 permit a seat belt 28 to be routed therethrough to secure it to a standard seat in a vehicle (not shown) when the car seat 10 is facing forward. This type of interconnection is one of many ways to secure the child seat 10 of the present invention to a vehicle seat.

Figure 2:
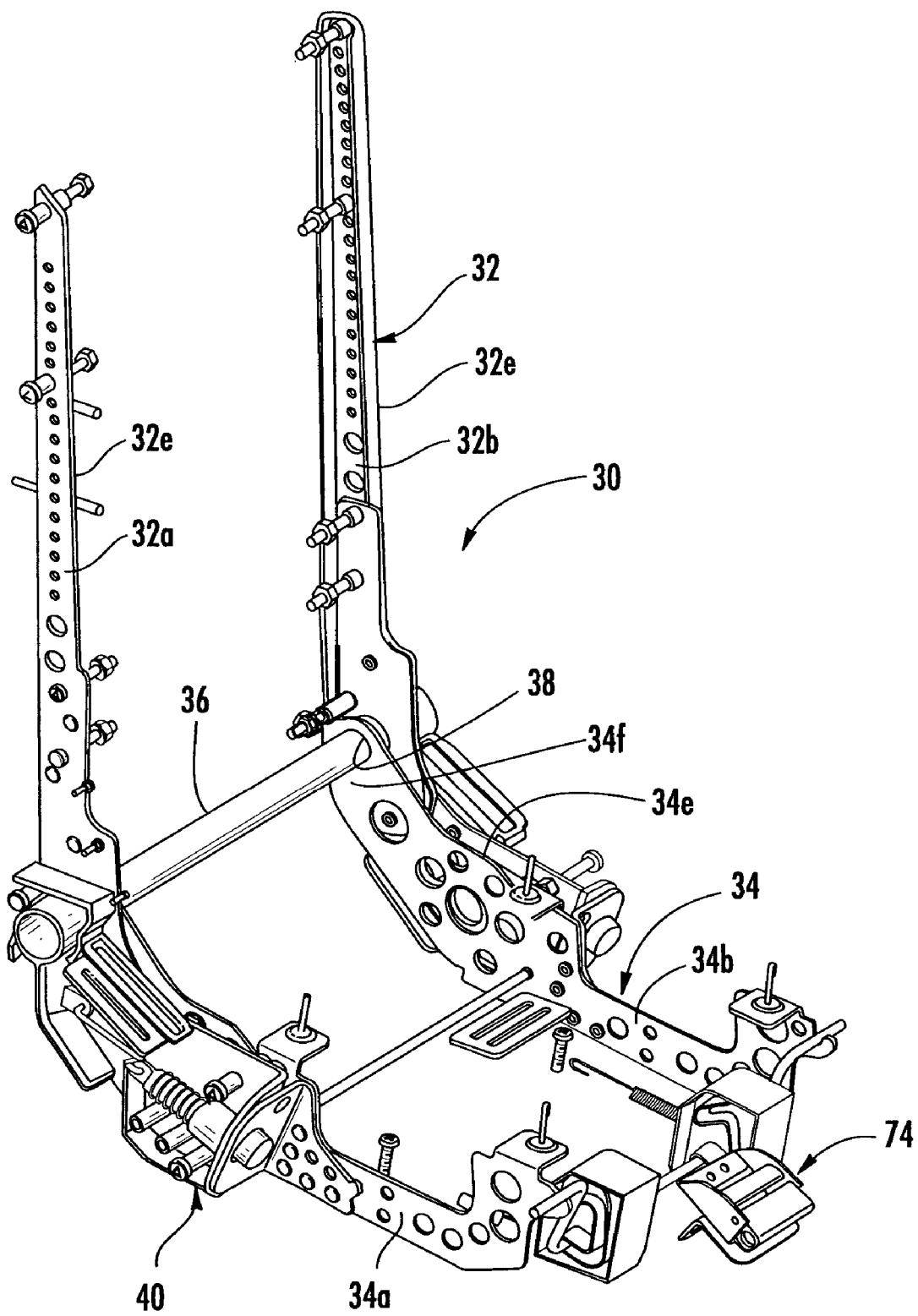
FIG. 2 is a perspective view of the folding frame structure of the present invention when in an open condition.

Turning now to FIG. 2-7, details of the novel and unique frame 30 of the seat 10 of the present invention is shown in detail. FIG. 2 shows the frame structure 30 with all of the cover housing 12a and 14a removed for ease of illustration and discussion. It can be seen that the frame 30 is of a foldable construction where a seat back frame 32 and a seat bottom frame 34 is provided. The seat bottom frame 34 is pivotally connected to the seat back frame 32 by a pivot rod 36 which runs through apertures 38 in the rearward free ends 34a of the seat bottom frame 34. Alternatively, the pivot rod 36 may be secured to the rearward free ends 34f of the seat bottom frame 34 where the pivot rod 36 rotates within an aperture in the seat back frame 32.

The seat back frame 32 and the seat bottom frame 34 each have at least one plate-like member that is oriented on its respective ends 32e and 34e, namely, in a vertical orientation to achieve a scissoring type folding action, as will be described below. Preferably, as shown, two vertically oriented plates 32a and 32b in spaced apart relation to one another are employed for the seat back frame 32. Also, preferably, two vertically oriented plates 34a and 34b in spaced apart relation to one another are employed for the seat bottom frame 34. While two vertically oriented plates are preferred for each frame 32 and 34, it is possible to employ only one, or more than two, vertically oriented frame member(s) for each of the seat back frame 32 and the seat bottom frame 34, and still be within the scope of the present invention. These plates 32a, 32b, 34a, 34b are preferably made of steel but could be made of other metal and non-metal materials that are suitable as frame members for bearing loads.

Figure 3:
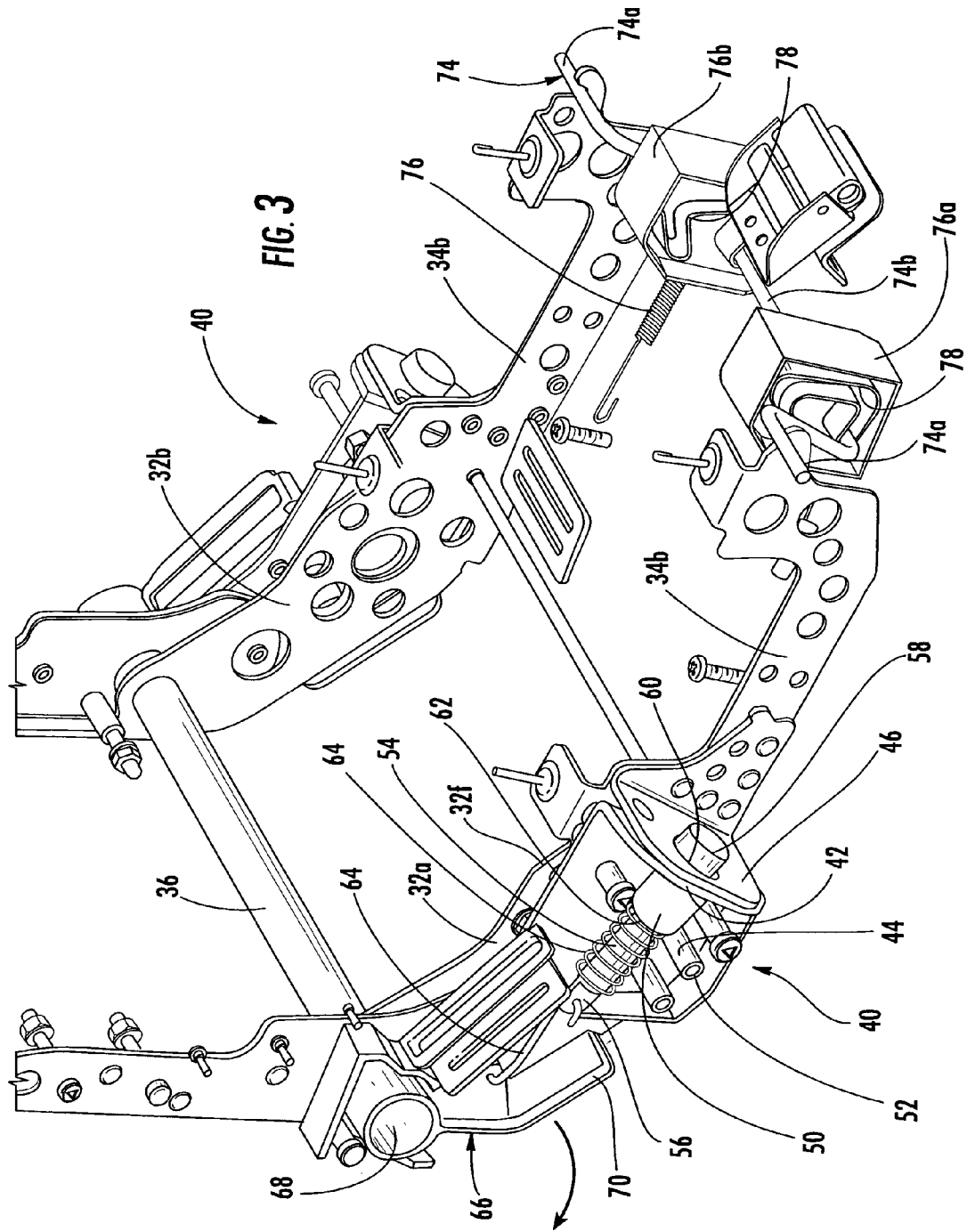
FIG. 3 is a close-up perspective view of the folding frame structure of the present invention when in an open condition.

Referring now to FIGS. 3-5, details of the locking mechanism, generally referred to as 40, and folding structure of the vehicle seat 10 of the present invention is shown. As stated above, the vertically oriented plates 34a, 34b of the seat bottom frame 34 are pivotally connected to the vertically oriented plates 32a, 32b of the seat back frame 32. A support stop member 42 is mounted or integrally formed with the seat back plate 34 and is in the form of an outwardly turned flange with an aperture 44 therethrough. A complementary lock plate 46 is connected to the seat bottom frame 34 and emanates outwardly therefrom. For example, as shown in FIG. 3, the lock plate 46 is riveted to the seat bottom frame 34 but it could be affixed in other ways and can be integrally formed with the seat bottom frame 34.

The support stop member 42 and the lock plate 46 serve to define the open angle of the child vehicle seat 10. More specifically, the seat bottom frame 34 pivots about an axis through the pivot rod 36 and, thereby, relative to the seat back frame 32. Rotation of the seat bottom frame 34 in a clockwise fashion is limited by communication of the lock plate 46 into the stop member 42 which is in the form of the outwardly turned flange. As a result, the pivot point of the folding child car seat 10 is above and behind the body of child where the structure for prevention further rotation is set off a selected distance away therefrom. As a result, a unique and novel cantilevered folding configuration is provided by the seat 10 of the present invention.

Figure 6:
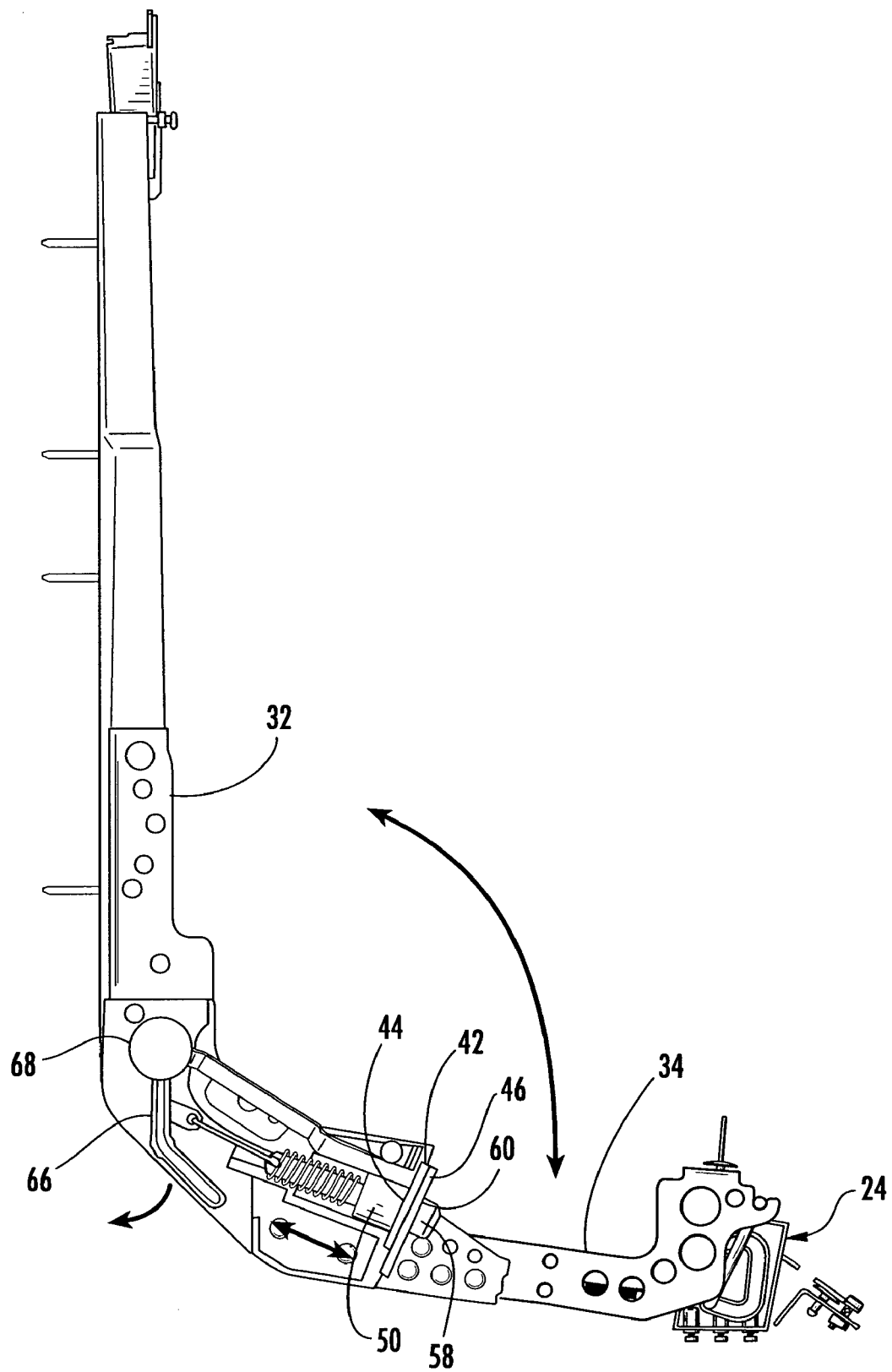
FIG. 6 is a side elevational view of the folding frame of the present invention in an open condition.
Figure 7:
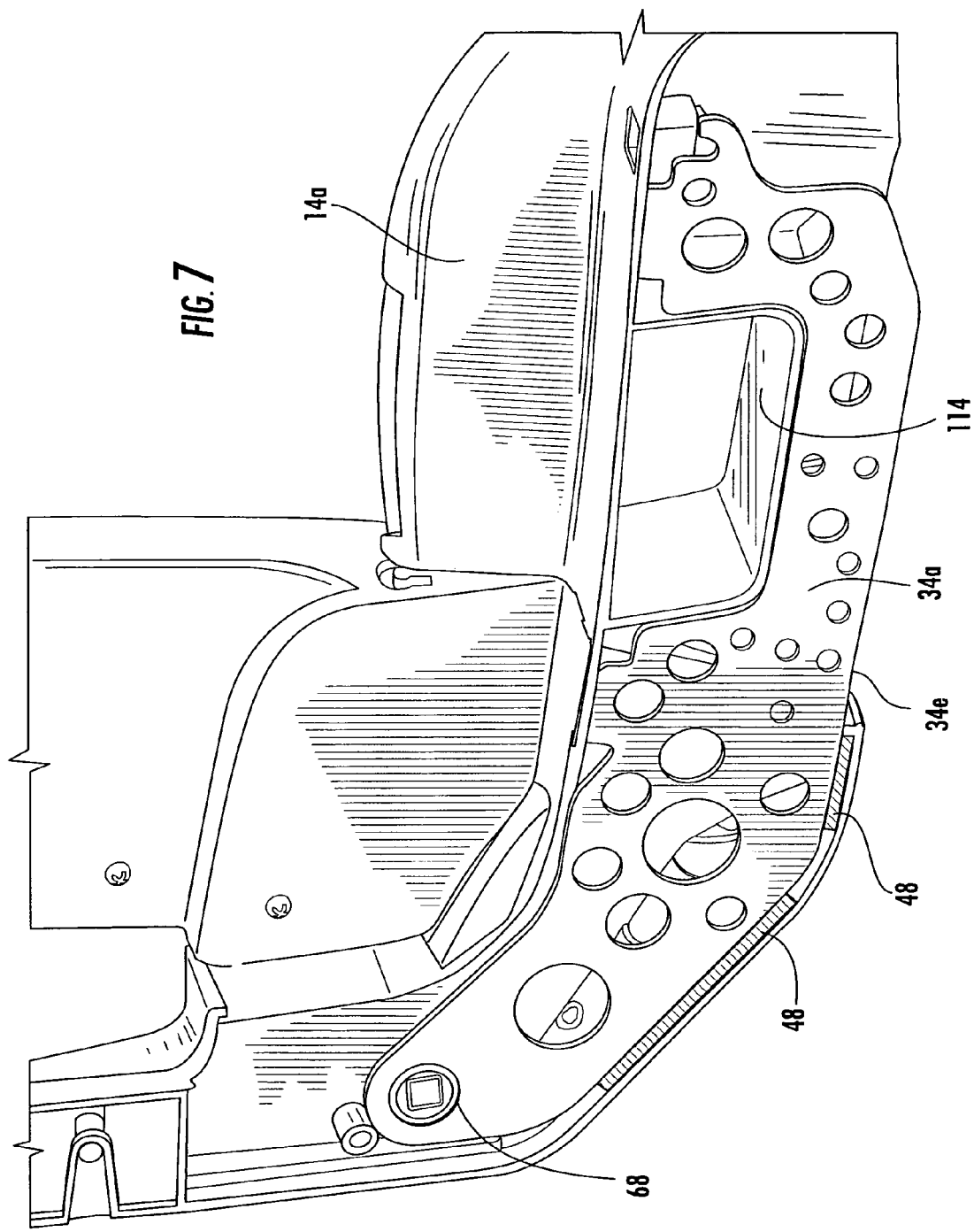
FIG. 7 is a close-up partial cut-away perspective view of a frame member in an open condition showing a cantilevered construction.
Figure 11:
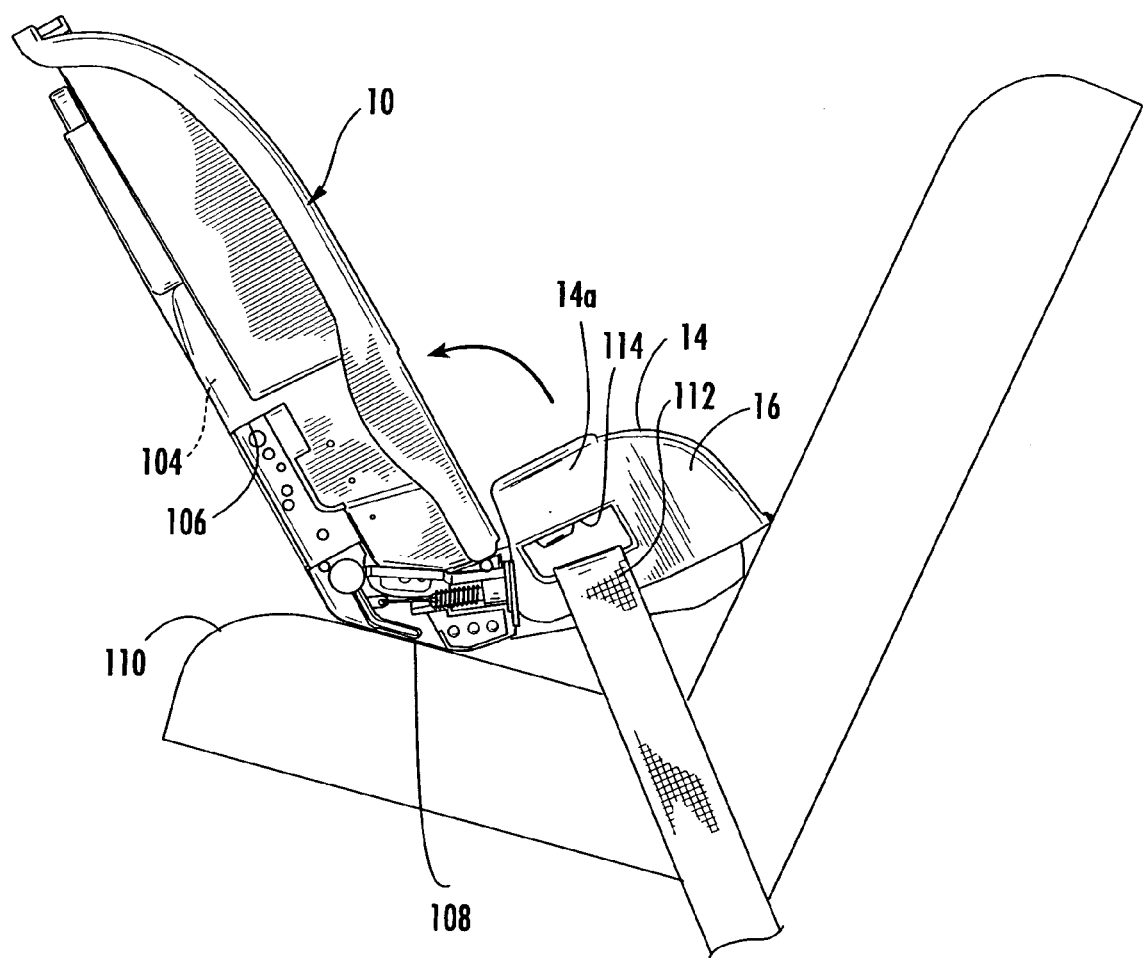
FIG. 11 is a side elevational view of the seat of the present invention in an open condition.

The unique cantilevered construction is particularly important in that it provides a secure structural configuration for preventing further clockwise rotation of the seat bottom frame 34 relative to the seat back frame 32. Due to the interface of the lock plate 46 with the stop member 42, even under force (such as would occur in an accident if the seat 10 was rear-facing in a vehicle, as seen in FIG. 11) it is not possible for the seat bottom 34 to rotate clockwise beyond what is shown in FIGS. 2, 3 and 6. Also, as seen in FIG. 7, which is a cross-sectional view through the line 7-7 of FIG. 1, the bottom edge 34e of the pivoting bottom frame 34 rests on tabs 48 that emanate inwardly from the seat back plate 32. This communication further supplements the engagement of the lock plate 46 and the stop member 42 to provide a complete cantilevered configuration.

Also of critical importance is the control of the counter-clockwise pivoting or rotation of the seat bottom frame 34 relative to the seat back frame 32. This is important because of the concern that a folding child car seat 10 may collapse due to the impact of an accident. More specifically, when an accident occurs, such a front impact, there is a tendency for the seat 10 to be thrown forward. This causes the seat back 12 to be urged forward with high force thereby placing downward force on the seat bottom 14. In the environment of a folding seat, forward and downward force into the seat bottom 14 causes significant stress on the pivot point of a folding seat. Therefore, a locking mechanism 40 must be employed to ensure that the folding seat does not collapse, that is the seat bottom 14 rotating in a counter-clockwise direction, in the event of an accident.

The preferred locking mechanism 40 of the present invention is shown and described in connection with FIGS. 3, 6 and 8. A spring-loaded lock pin 50 is mounted to seat back frame 32a so it can actuate back and forth. The lock pin 50 resides in a channel 52 defined by the seat back frame 32. The lock pin 50 includes a reduced neck 54 portion with an eye 56 on its free end and a pin head 58 with rounded free end that is extendable through the aperture 44 in the stop member 42 and an aperture 60 in the lock plate 46. The pin head 50 also includes an internal seat 62. The reduced neck portion 54 is connected to the pin head 58 and carries a coil spring 64 that is positioned between the internal seat 62 and a channel seat 52 defined by the seat back frame 32. A linkage 64 interconnects the reduced neck portion 54 to a pivot handle 66, at a midpoint between a pivot point 68 and the free end 70 of the handle 66, which is connected to the seat back frame 32. Pulling the pivot handle 66 causes it to pivot about its pivot point 68 thereby pulling on the reduced neck portion 54 of the lock pin 50 against the forces of the coil spring 64. As a result, the pin head 58 actuates in an out of the aperture 44 in the stop member 42 and the aperture 60 in the lock plate 46.

In FIG. 6, the seat back frame 32 and the seat bottom frame 34 are in an open engaged condition where the lock pin is routed through the aperture 44 in the stop member 42 and through the aperture 60 in the lock member 46. With the pin head 58 in this position and in view of the pivot point 68 of the back frame 32 relative to the bottom frame 34 it is impossible for the lock plate 46 to slidably move relative to the stop member 42. Thus, the locking mechanism 40 effectively secures the back frame 32 to the bottom frame 34 in the unique cantilevered configuration of the present invention. To permit collapsing of the folding seat 10, the handle 66 is pulled to retract the pin head 58 to permit the lock plate 46 to pass by the stop member 42 on the back frame 32. Thus, an operator of the seat 10 can easily engage and disengage the locking mechanism 40 of the present invention without sacrificing the integrity of the cantilevered structure of the seat 10 of the present invention.

It should be understood that only one side of the locking mechanism 40 was described above. The locking mechanism on the opposing side of the seat operates in identical fashion. In this preferred embodiment, locking mechanisms 40 are intended to operate in unison for ease of use. A second pivot handle corresponding to a second locking mechanism is linked to a first pivot handle via the pivot rod 36. Thus, pulling either one or both of the handles will cause the locking mechanisms 40 to actuate.

While this is a preferred locking mechanism, it is only one of many different types and configurations of locking mechanisms 40 that may be employed. For example, the locking mechanisms 40 on opposing sides of the seat 10 construction may be configured to operate independently. Also, the locking pins 50 may be oriented transversely through the seat bottom frame 34 rather than in parallel therewith. Further, other locking structures that do not employ a spring-loaded pin 50 and lock plate 46 may be employed and still be within the scope of the present invention.

Figure 8:
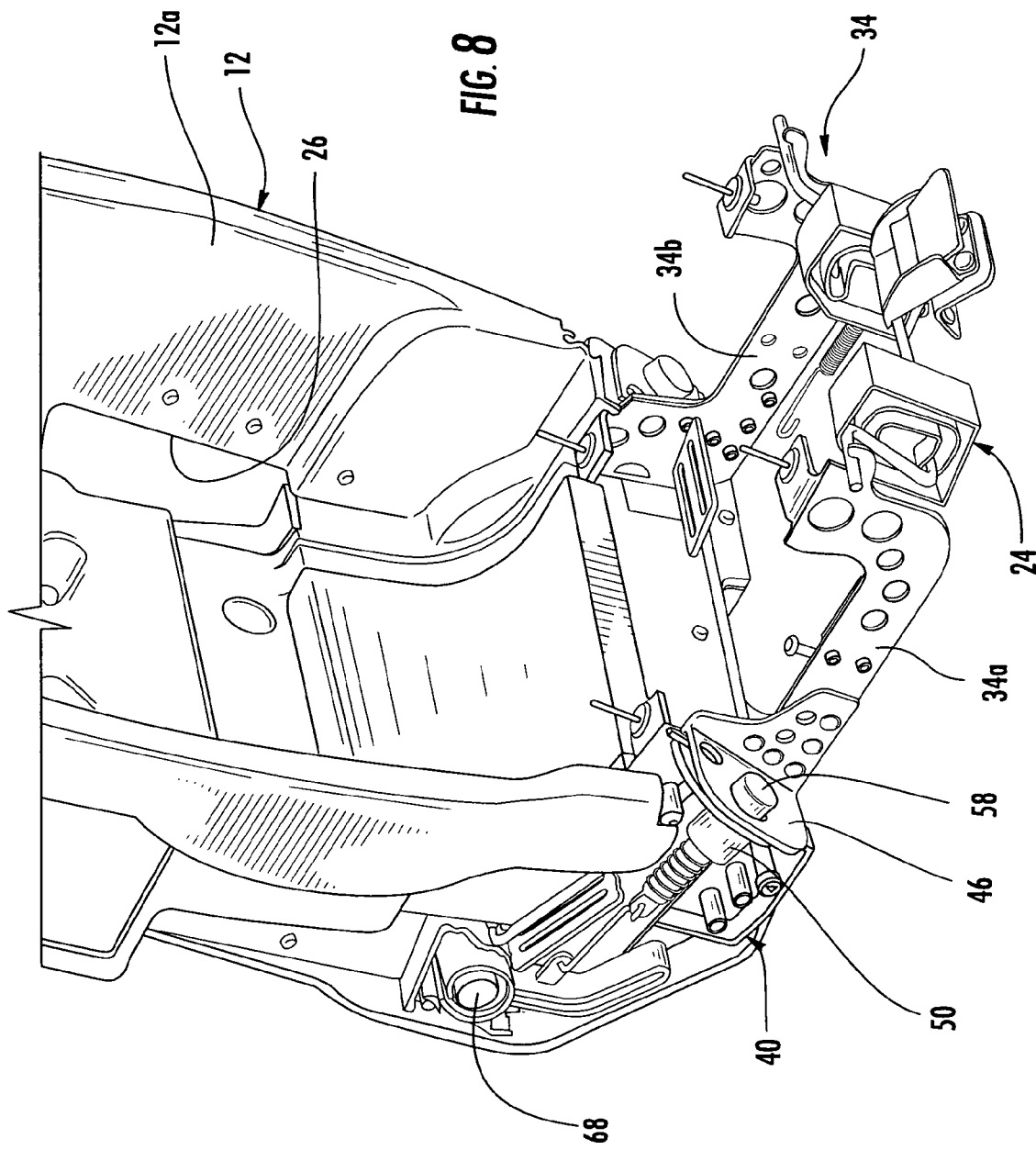
FIG. 8 is a perspective view of the seat of the present invention in an open condition with the seat bottom housing removed.
Figure 9:
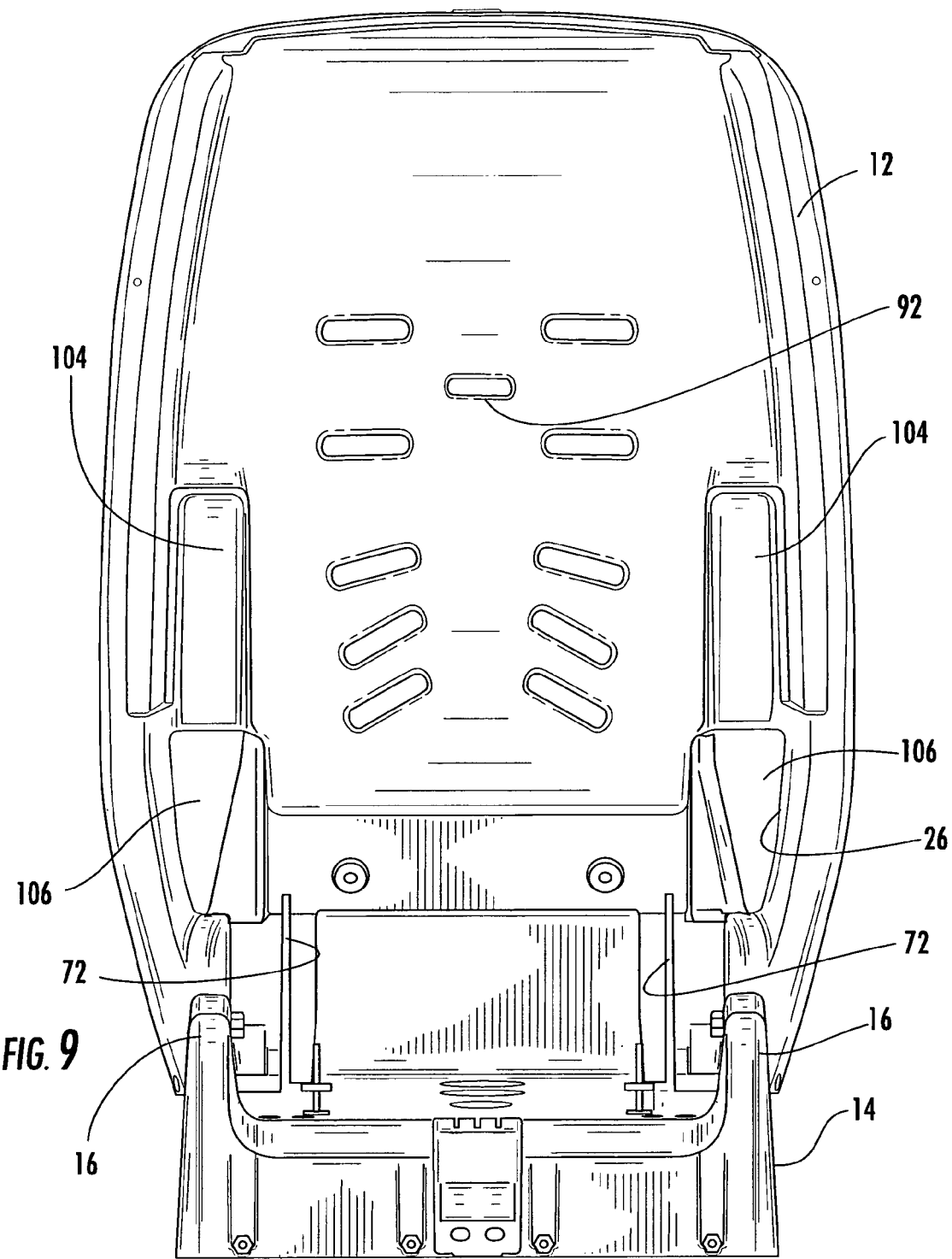
FIG. 9 is a front elevational view of the seat of the present invention in an open condition.
Figure 10:
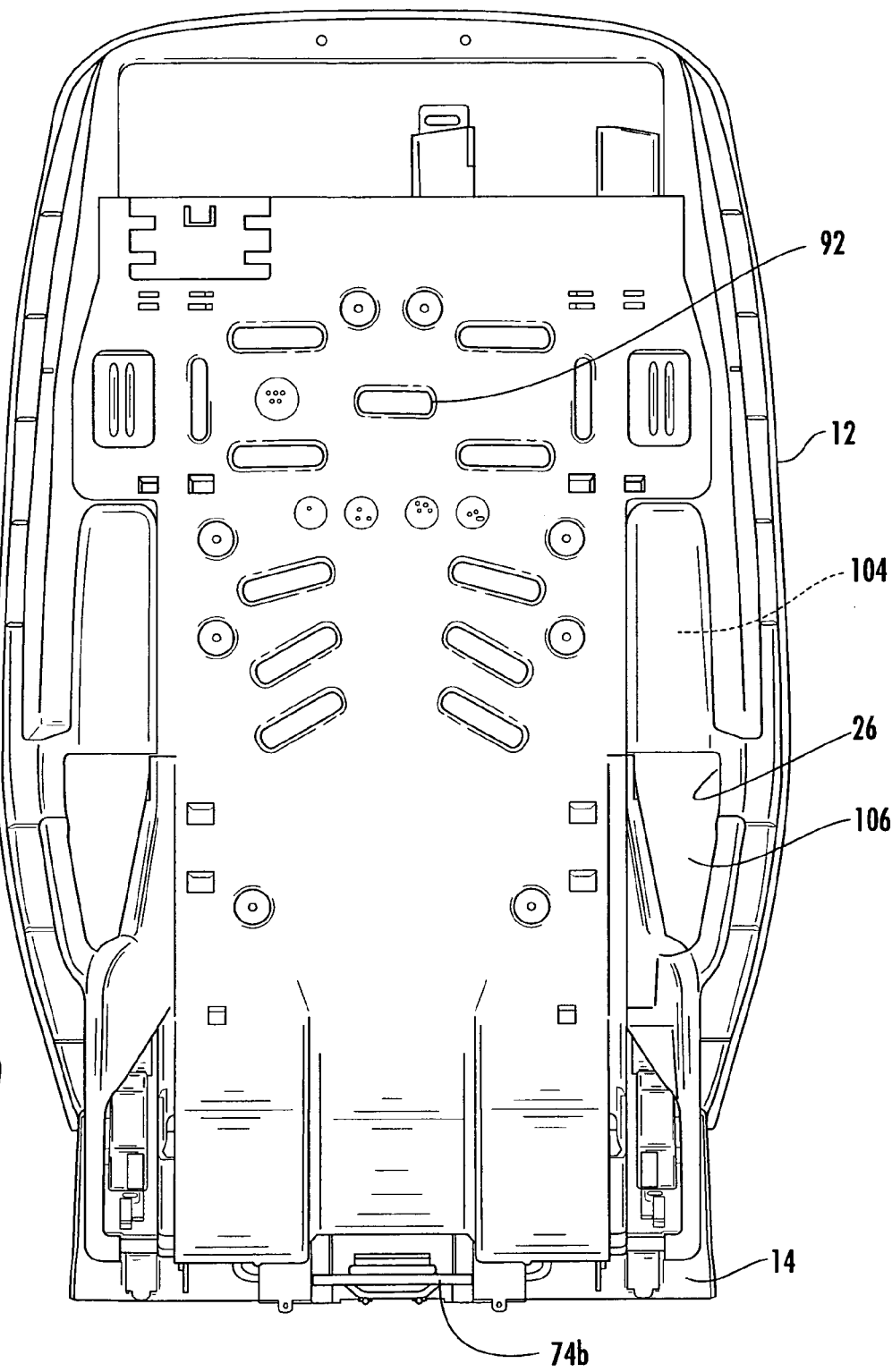
FIG. 10 is a rear elevational view of the seat of the present invention in an open condition.

Referring now to FIG. 8, a perspective view of the seat 10 of the present invention is shown where the cover housing 14a for the seat bottom 14 is removed for illustration purposes. As discussed above, the seat bottom plates 34a, 34b are preferably vertically oriented plates. Not only are the vertically oriented plates 32a, 32b, 34a, 34b preferred to provide an internal framework for the seat 10, the vertical positioning of the frame members 32a, 32b, 34a, 34b, particularly those of the bottom frame member 34, namely, 34a, 34b, can effectively scissor relative to the back frame members 32a, 32b to provide a unique compact folding structure.

Also, as can be seen in FIG. 8, the vertically oriented plates 34a, 34b of the bottom frame member 34 permit the bottom seat member 14 to pivot more closely to the seat back member 12 because the seat cover 14a on the seat bottom 14 covers a distal portion of the seat bottom frame members 34a, 34b leaving an interconnecting portion of the seat bottom frame members 34a, 34b that are only vertically oriented plates. As will be described in further detail in connection with FIGS. 12 and 13, the pivoting exposed portions 34x of the vertically oriented plates 34a, 34b of the bottom frame member 34 pass through slots 72 in the housing 12a of the seat back member 12 in a scissor-like fashion whereby the bottom frame members 34a, 34b pass through a plane defined by the front surface of the seat back member 12. As will be made clear below, this unique folding mechanism allows the seat bottom 14 to fold up and nest fully within the seat back member 12.

Referring back to FIGS. 1-5, a height adjustment mechanism, generally referred to as 24, for adjusting the angle and height of how the seat bottom 14 rests against a support surface, such as the top surface of a standard vehicle seat (not shown). Preferably, an axle 74, at its free ends 74a, is pivotally mounted to the bottom frame members 34a, 34b. The axle 74 includes a bent middle portion 74b that is spring-biased in a rearward direction by coil springs 76 connected thereto that are mounted to the bottom of the housing 14a of the seat bottom 14. Preferably, a pair of adjustment blocks 76a and 76b are routed over the middle portion 74b of the axle 74 via a substantially C-shaped channels 78 therein. The blocks 76a, 76b are mounted to a lower contact plate 80, as seen in FIGS. 12 and 13 via fasteners 82.

The lower contact plate 80 of the seat bottom 14 includes a notch 84 where the middle portion 74b of the axle 74 is freely manipulateable from the outside of the seat 10. By manipulating the middle portion 74b of the axle 74, the blocks 76a, 76b are movably positioned on the axle 74 to position the lower contact plate 80 thereby providing different lower contact surfaces for the raising the height of the seat bottom 14 when in contact with a support surface. For example, it may be desirable to have the seat 10 be positioned in a more reclined orientation. By dropping the forwardmost portion of lower contact surface, the front of the seat 10 at the seat bottom 14 will be higher thereby causing the seat back 12 to correspondingly tilt backward slightly providing the reclined position because the relative angle of the seat bottom 14 to the seat back 12 is preferably fixed.

It should be understood that the height adjustment plate 80 is optional in the folding seat 10 of the present invention. Moreover, the use of a bent axle 74 and blocks 76a, 76b thereon is merely a preferred structure and that other structures for adjusting the height of the seat bottom 14 and thereby the angle of seat back 12 may be employed and are considering within the scope of the present invention.

Figure 12:
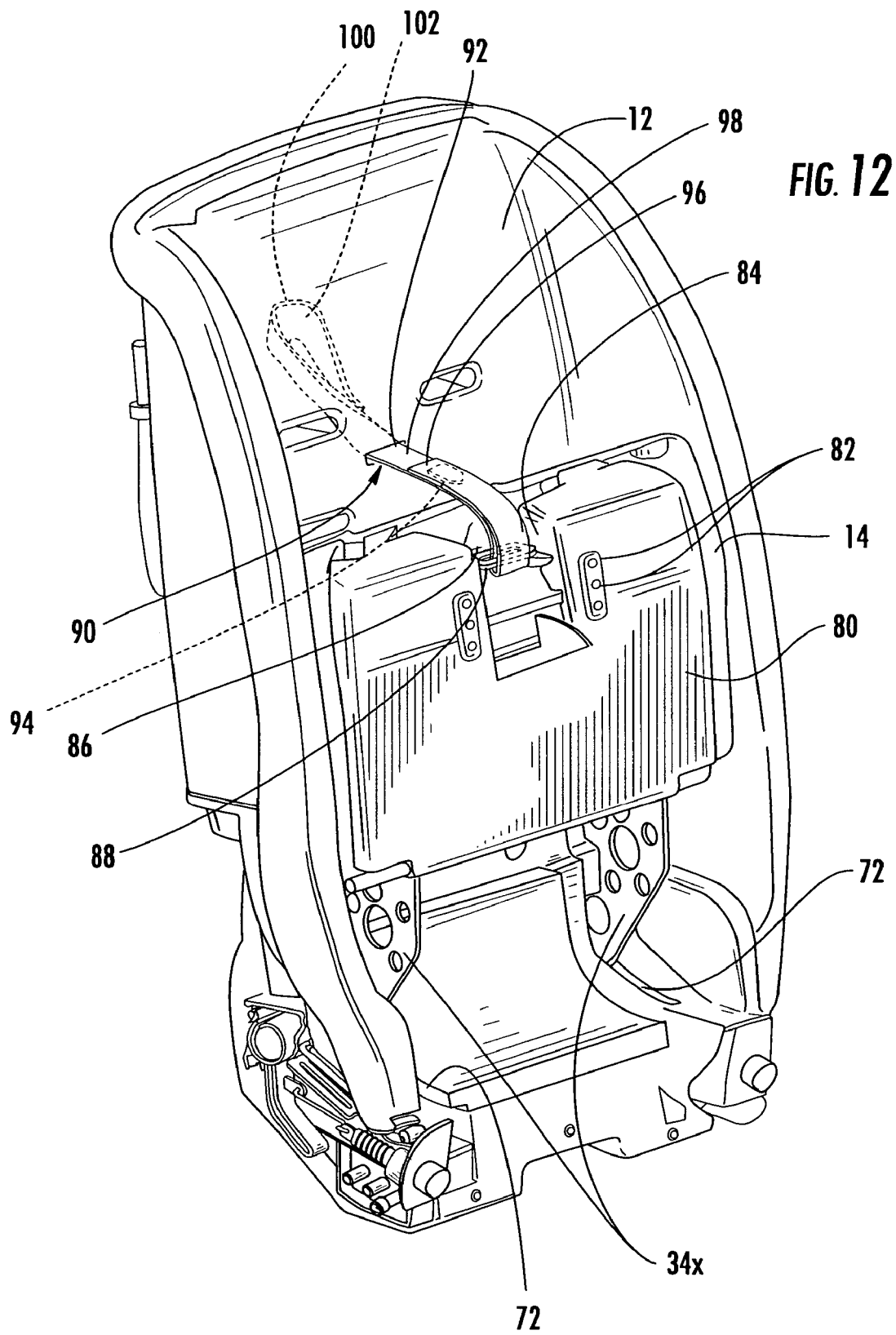
FIG. 12 is a front perspective view of the seat of the present invention in a closed condition.
Figure 13:
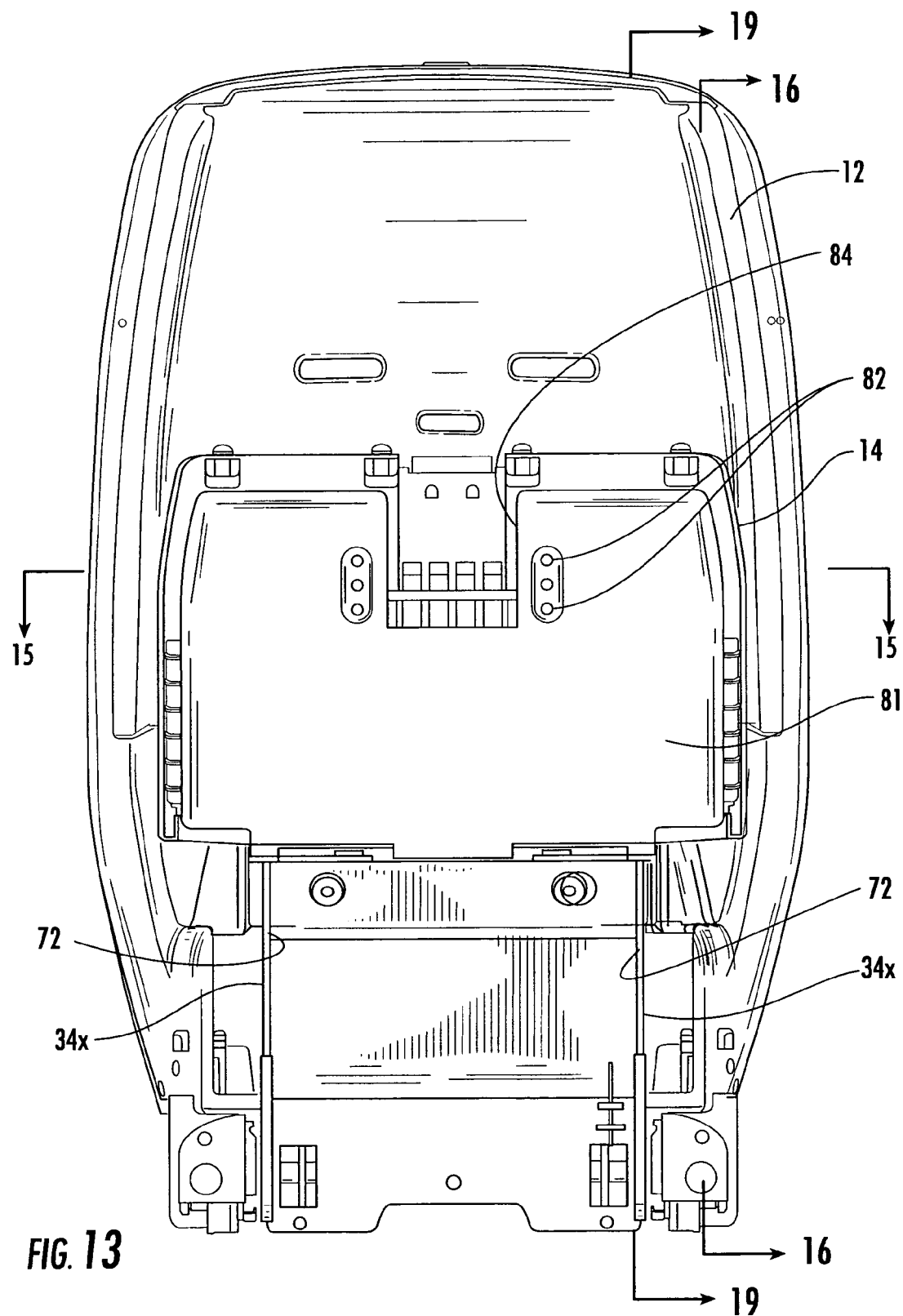
FIG. 13 is a front elevational view of the seat of the present invention in a closed condition.

As seen in FIGS. 2-5 and 12, a strap plate 86 with an aperture 88 therethrough is provided. The strap plate 86 is employed to receive a carry strap 90 therethrough as one of many different ways to easily transport the folding car seat 10 when it is in a folded condition. The strap plate 86, in this preferred embodiment, is secured to the bottom of the seat bottom 14 to emanate therefrom. When the seat bottom 14 is folded or nested into the seat back 12, as seen in FIG. 12, the strap plate 86 is positioned proximal to one of the pass-through slots, namely a central slot 92, in the housing 12a of the seat back 12. A length of strap material 90, which could be nylon or cloth is looped through the aperture in the strap plate and secured in place using the hook and loop fastener material 94 respectively on the first free end 96 of the strap and complementary material in the middle portion 98 of the strap. The second free end 100 of the carry strap 90 includes a permanent loop of strap material 102. Thus, when the seat 10 is in a folded condition, it can be easily carried using the loop 102 on the free end 100 of the strap 90 while keeping the seat 10 in a compact folded condition.

In FIGS. 6-10, further details of the construction of the housing 12a of the seat back 12 and the interaction with the side arm rests 16 of the seat bottom 14 are shown in detail. The seat back 12 includes an outer housing 12a that has a pair of recesses 104 and optionally corresponding apertures 106 that permit the side armrests 16 emanating upwardly from the housing 14a of the seat bottom 14 member to compactly nest therein. The recesses 104 and apertures 106 are of a shape and configuration that are complementary to the shape and configuration of the side arm rests 16 so that when the seat bottom 14 is folded up it closely mates with the seat back member 12.

FIG. 11 further illustrates a side elevational view of the child car seat 10 in an open condition and mounted in a rearward-facing manner which is an alternative to the forward-facing orientation shown in FIG. 1. In FIG. 11, a bottom chamfered surface 108 of the housing 12a of the seat back 12 sits on the top surface of a car seat 110 with a seat belt 112 being routed through pass-through apertures 114 in the housing 14a of seat bottom 14 to secure it in place. The apertures 114 in the seat bottom 14 are in a preferred location but may be in a different location if desired and still be within the scope of the present invention.

As can be seen in FIGS. 12-16, details of the compact nesting of the seat bottom 14 into the seat back 12 is shown in further detail. In FIG. 12, a perspective view of the folding seat 10 of the present invention is shown in a fully folded condition. FIG. 13 shows a rear elevational view of the folded seat of FIG. 12. The bare portions 34x of the vertically oriented plates 34a, 34b of the seat bottom frame 34 scissor through the corresponding grooves 72 in the housing 12a of the seat back member 12.

Figure 14:
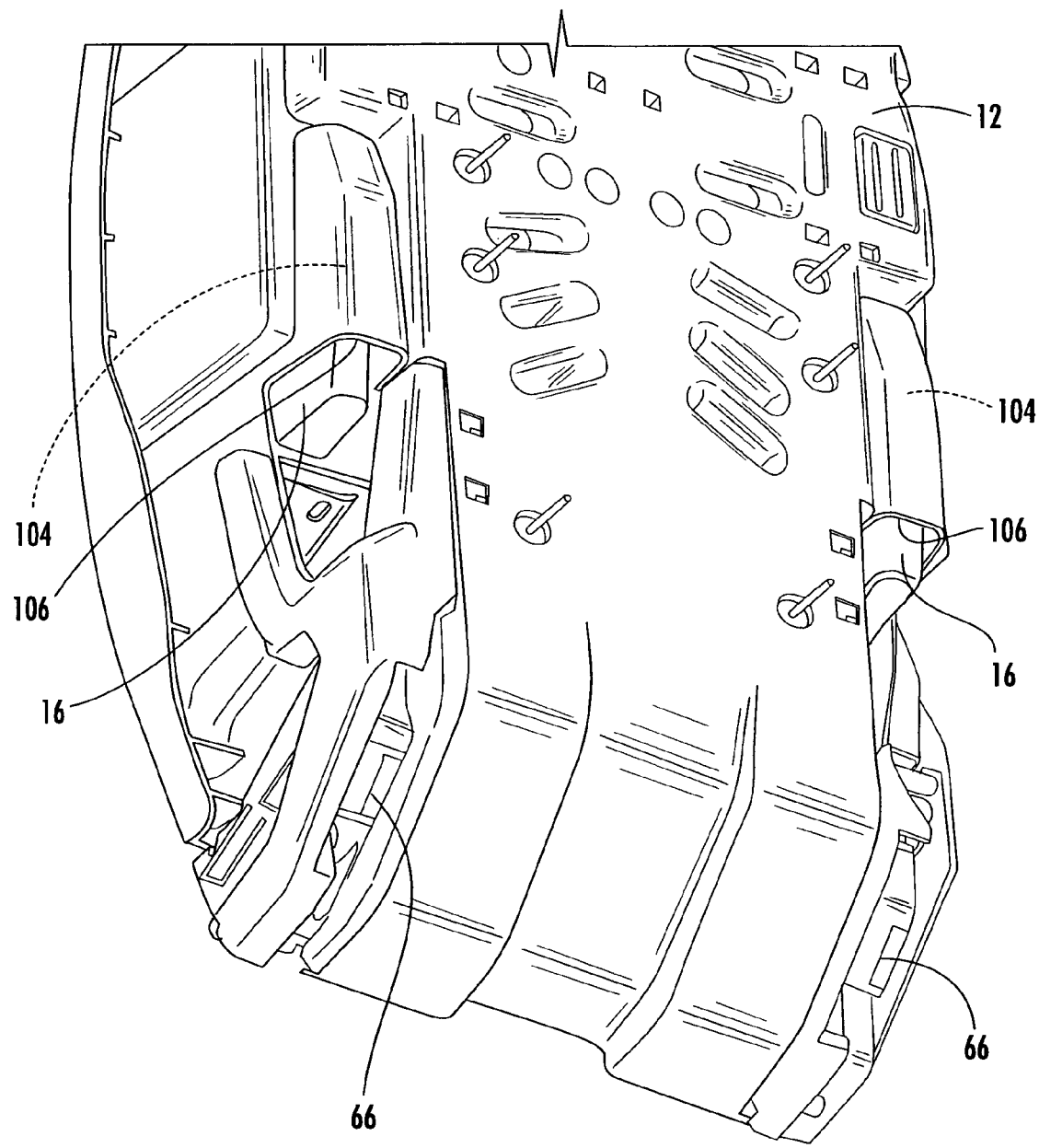
FIG. 14 is a bottom perspective view of the seat of the present invention in a closed condition.
Figure 15:
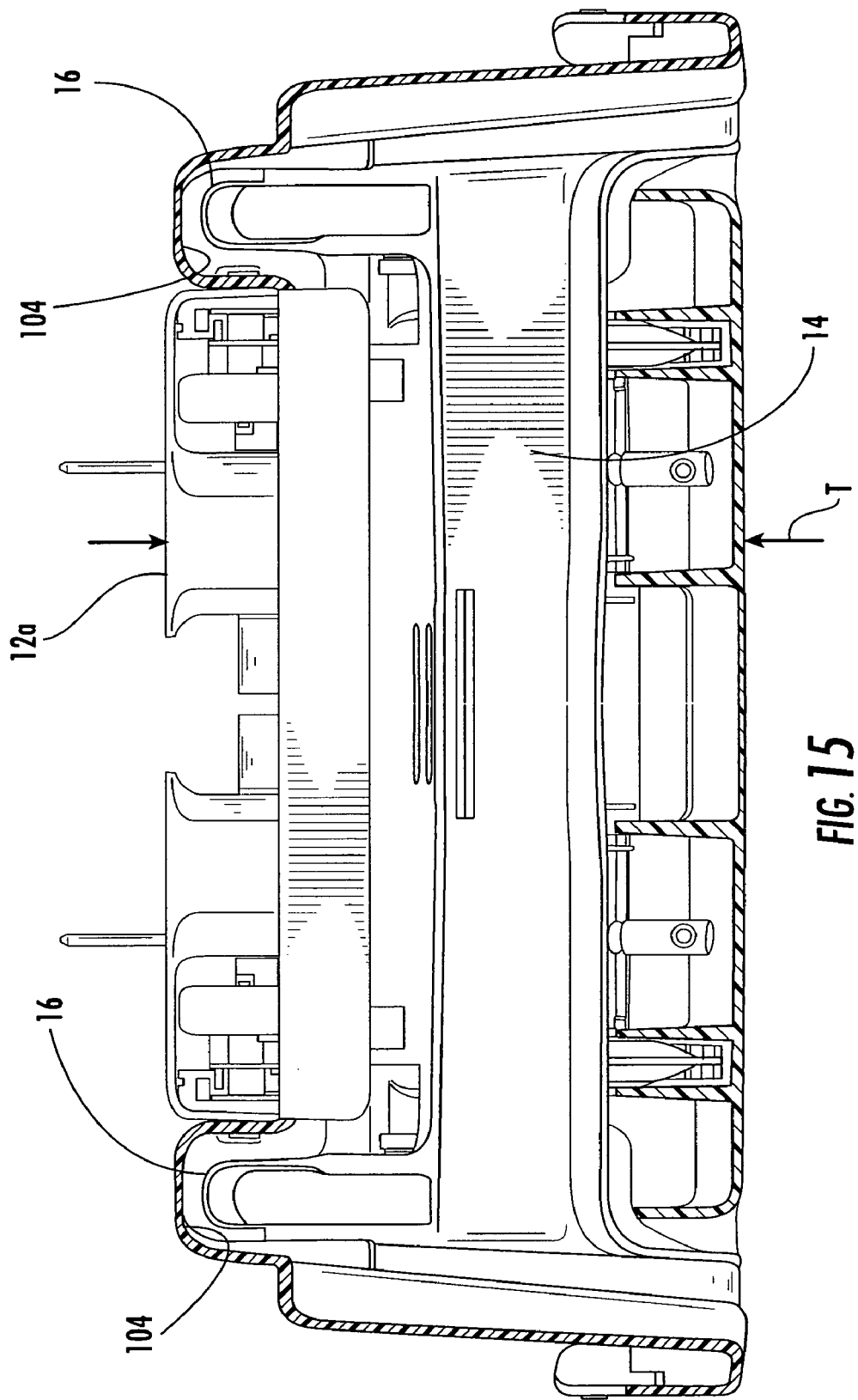
FIG. 15 is a cross-sectional view through the line 15-15 of FIG. 13.
Figure 16:
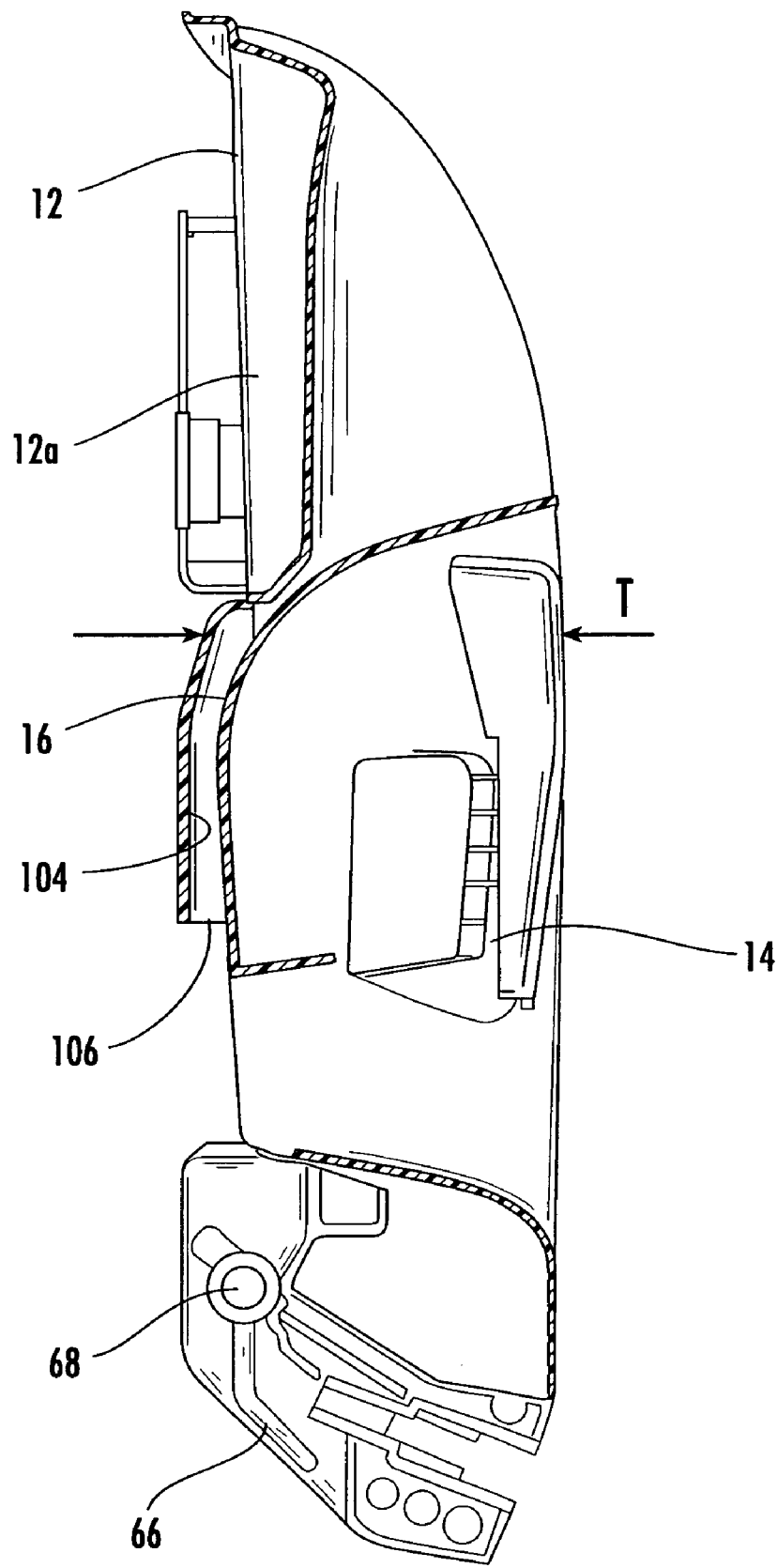
FIG. 16 is a cross-sectional view through the line 16-16 of FIG. 13.

Thus, the overall thickness of the seat, as folded, shown as T in FIG. 15, is significantly reduced compared to prior art folding seats. This is due to the aforesaid nesting of the side arm rests 16 within the housing 12a of the seat back member 12. As seen in FIG. 14, which is a bottom rear perspective view of the seat 10 in a folded condition, shows the side arm rests 16 of the seat bottom 14 residing within the respective recesses 104 in the housing 12a of the seat back 12. FIG. 15 illustrates a cross-sectional view through the line 15-15 of FIG. 13 where the side arm rests 16 are housed within their respective recesses 104 when the seat 10 is in its folded condition. Still further, FIG. 16 illustrates a cross-sectional view through the line 16-16 of FIG. 13 to further show the unique nesting of the side arm rests 16 within the housing 12a of the seat back 12 and the reduced thickness T of the seat when in a folded condition.

Preferably, pass-through apertures 106 are provided with each recess 104 to further reduced the overall weight of the folding seat 10 of the present invention. Alternatively, it is possible to provide the recesses 104 without corresponding apertures 106 and still be within the scope of the present invention.

Figure 17:
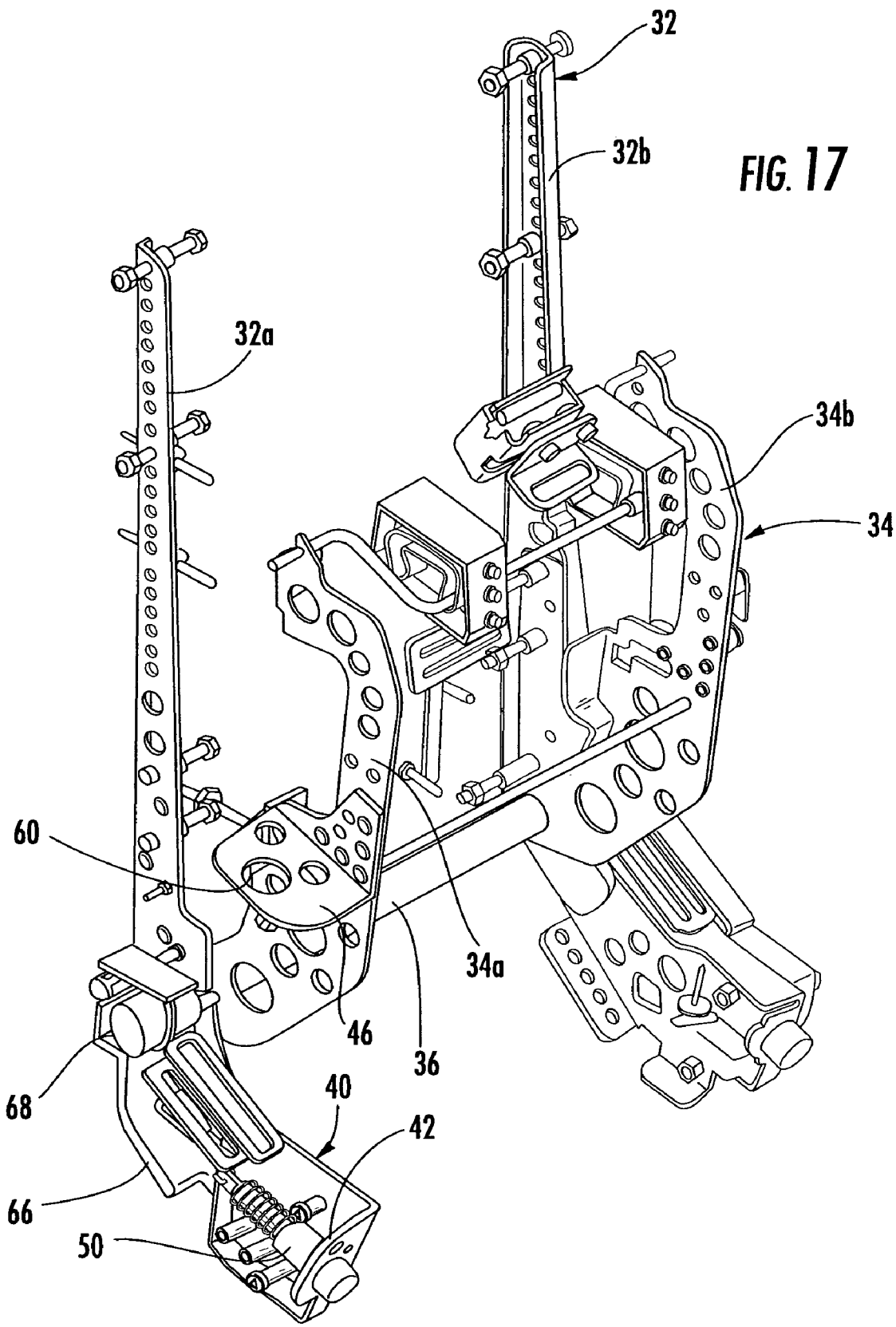
FIG. 17 is a front perspective view of the frame construction of seat of the present invention.
Figure 18:
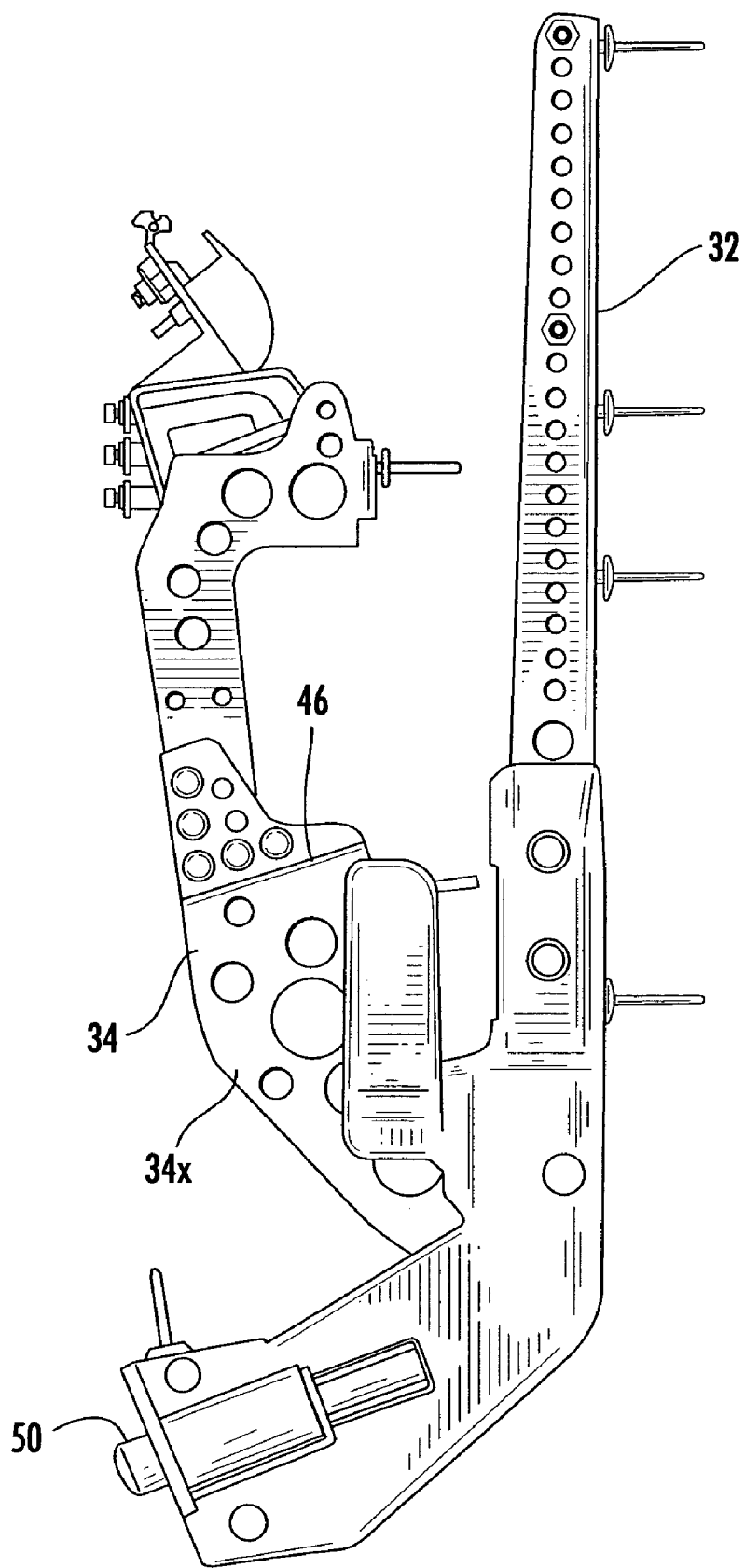
FIG. 18 is side elevational view of the frame construction of the seat of the present invention.
Figure 19:
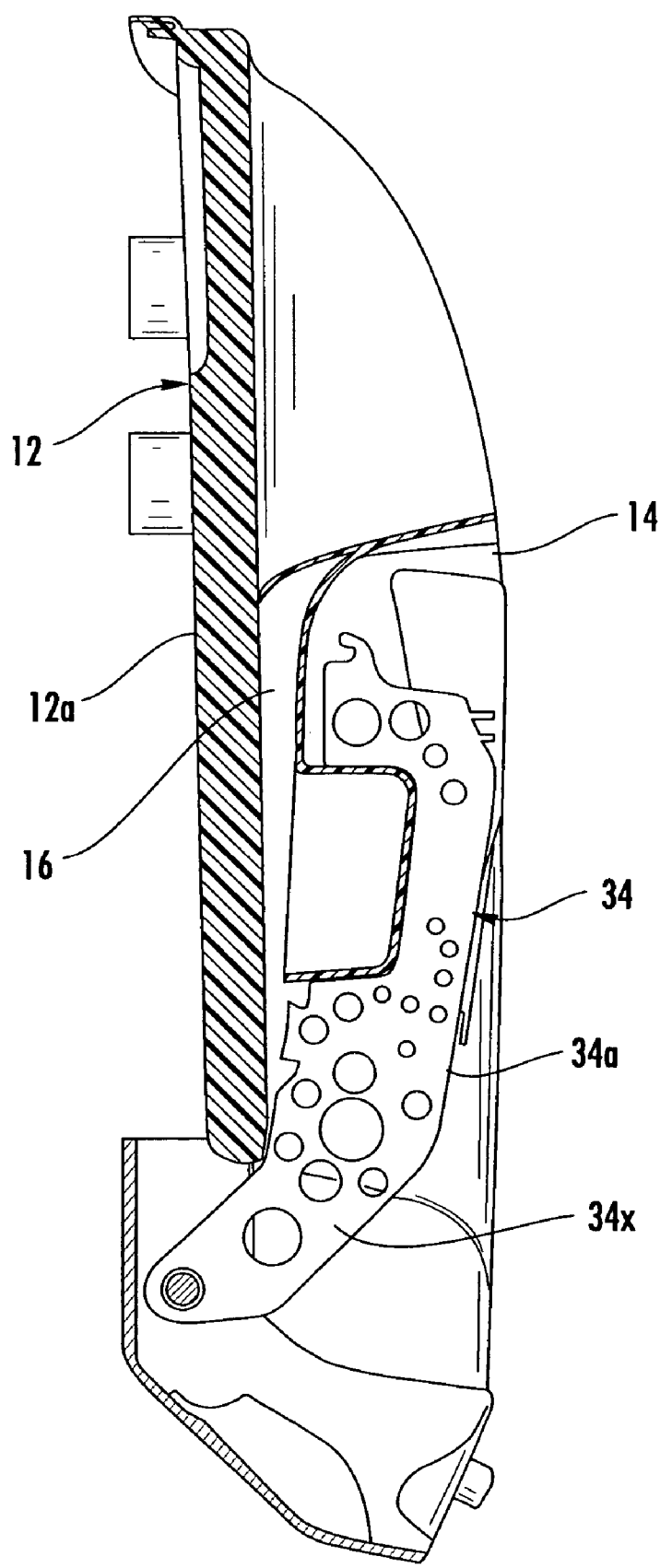
FIG. 19 is a cross-sectional view through the line 19-19 of FIG. 13.

Referring now to FIGS. 17-19, details of the seat bottom frame 34 folded up to the seat back frame 32 is shown. In FIG. 17, a perspective view of the folding seat 10 of the present invention with the seat back housing 12a and the seat bottom housing 14a removed for illustration purposes and ease of discussion. The seat bottom frame 34, with frame members 34a, 34b, is pivotally mounted about the pivot rod 36 so it can pivot to an upward, closed condition, as seen in FIG. 17. FIG. 18 illustrates a side elevational view of the folded frame 32, 34 of FIG. 17. Also, FIG. 19 further illustrates a cross-section view through the line 19-19 of FIG. 13 to illustrate the positioning of the seat bottom frame 34 within the seat bottom 14 when it is in a folded condition and fully nested with the seat back housing 12a.

The vertically oriented plates 32a, 32b, 34a, 34b of the present invention are the preferred frame construction for the child car seat 10 of the present invention. As described above, the orienting plate-like members on end in a vertical fashion enables a much larger load to be supported with the same or lesser amount of frame material. The use of internal vertically oriented plates 32a, 32b, 34a, 34b are unique in a child vehicle seat 10, whether that seat is of the folding type or of the non-folding type.

Figure 20:
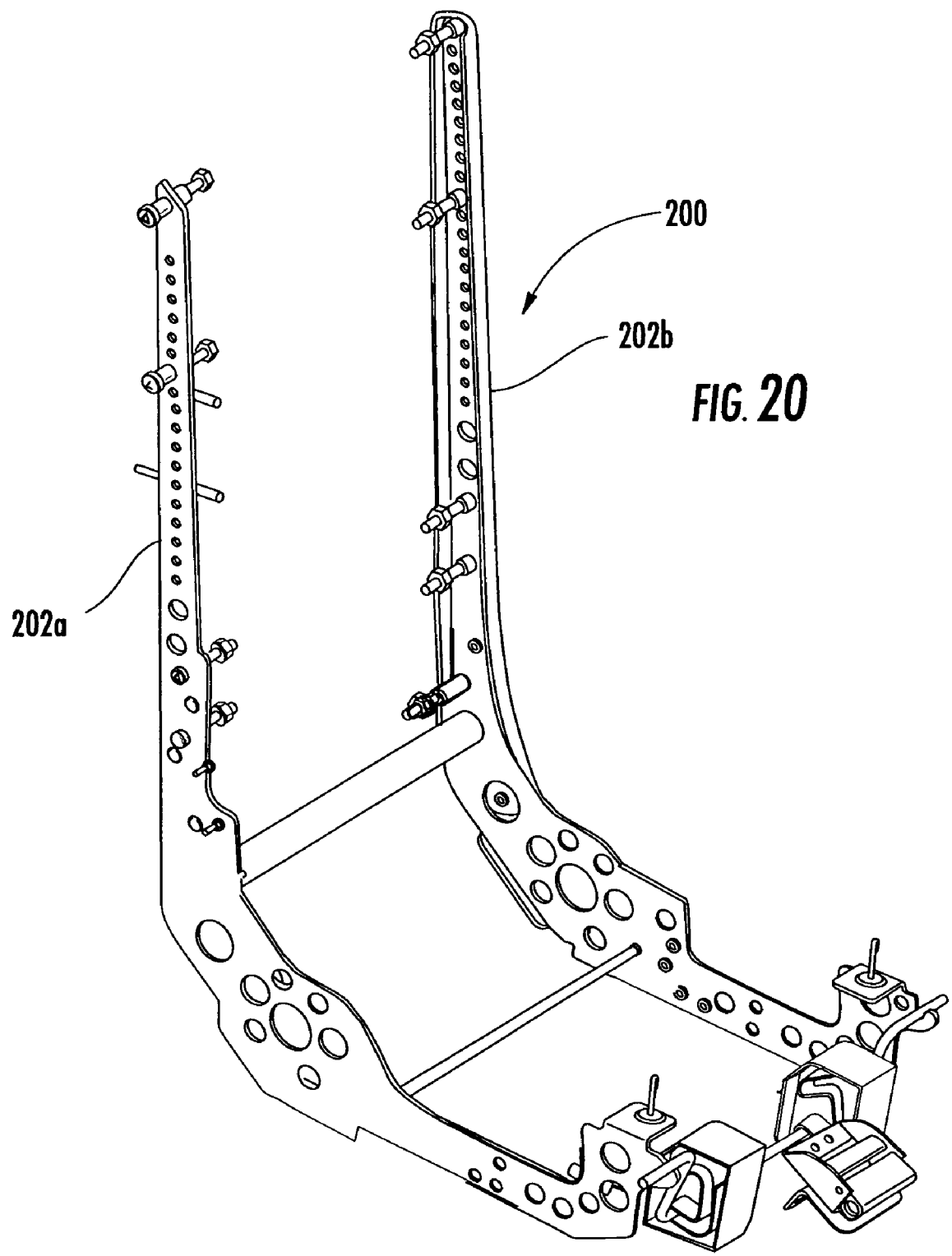
FIG. 20 is a perspective view of an alternative embodiment of the frame structure of the present invention.

In that connection, an alternative embodiment of the child vehicle seat 200 of the present invention is shown in FIG. 20 that provides a non-folding version of the seat 10 shown in FIGS. 1-19 employing the unique vertically oriented plates 32a, 32b, 34a, 34b as a frame structure. At least one vertically oriented plate, such as plates 202a and 202b, is provided to serve as the underlying framework for the alternative embodiment 200 of the present invention shown in FIG. 20. Preferably, two L-shaped plates 202a and 202b are provided at opposing ends of the seat 200. However, more than two plates can be employed and still be within the scope of the present invention. Also, plates are preferably L-shaped in configuration and may each be formed of a single unitary plate or from more than one plate attached together, such as by riveting or welding.

In this alternative embodiment, an outer housing (not shown in FIG. 20) is provided over the frame members to provide a desired ergonomic seat shape. For example, the outer housing, in this alternative embodiment 200, is preferably a unitary housing construction that is laid over the underlying frame 202a, 202b. As an alternative, two or more housing sections may be secured to the underlying frame to form a seat housing shape suitable for receipt of a child therein. Appropriate additional cushioning or pillows can be added as needed, such as shown in FIG. 21 below.

Referring to FIG. 21, a view of the a finished folding child vehicle seat 10 of the present invention is shown with full padding and cushioning 20 and appropriate safety belts 140 in place. Such safety belts 140 are known in the art which include a pair of shoulder belts 140a, 140b that terminate to a central connection point 142 between the child legs (not shown). A buckle 144 is provided for releasable connection thereof. Appropriate flaps 146a, 146b, 146c are provided in the outer padding 20 of the seat 10 to permit access to all of the components discussed in detail above. For example, a flap 146c on the seat bottom 14 permits access to the strap plate 86 shown in FIG. 12. Also, flaps 146a, 146b in the padding 20 in the seat back 12 permit the side arm rests 16 to compactly nest therein, as described above. Thus, the padding 20 provides an additional cushioning between the passenger and the seat bottom 14 and the seat back 12.

In view of the foregoing, a new and novel child car seat 10, 200 is provided that can be either folding or non-folding in configuration. A unique frame structure 32, 34 is provided with plate members oriented vertically on their respective ends for added strength. In the folding embodiment, a unique cantilevered configuration is provided that positions the seat bottom 14 in an open condition while a locking system 40 secures it in an open condition for greatly improved security.

It would be appreciated by those skilled in the art that various changes and modifications can be made to the illustrated embodiments without departing from the spirit of the present invention. All such modifications and changes are intended to be covered by the appended claims.

What is claimed is:

1. A car seat, comprising:
a first seat member;
a second seat member at an angle relative to the first seat member; each of the
first seat member and the second seat member having a top edge, bottom edge, side edges and a front face and a rear face;
pivot means connected to the first seat member;
the first seat member defining a first surface and the second seat member defining a second surface; pivoting of the first seat member relative to the second seat member enables the second surface to intersect through the first surface;
the second seat member being pivotable between a closed position and an open position; and
wherein the first seat member defines at least one slot therein; the second seat member being movable through the at least one slot upon pivoting of the second seat member relative to the first seat member.

2. The car seat of claim 1, further comprising:
a support member located proximal to the bottom edge of the first seat member;
whereby in the open position, the point of communication between the second seat member and the support member is a distance of more than one inch from the axis location of the pivot means.

3. The car seat of claim 1, further comprising:
means for maintaining the first seat member in an open position relative to the second seat member.

4. The car seat of claim 1, further comprising:
at least one first frame member connected to the first seat member; the at least
one first frame member connected to the pivot means attached to the second seat member.

5. The car seat of claim 4, further comprising:
at least one second frame member connected to the second seat member; the
at least one second frame member being connected to the pivot means attached to the first seat member.

6. The car seat of claim 5, wherein the at least one second frame member is a vertically oriented plate.

7. The car seat of claim 5, wherein the at least one second frame member is of an L-shaped configuration.

8. The car seat of claim 5, wherein the at least one second frame member is made of steel.

9. The car seat of claim 5, wherein the at least one first frame member and the first seat member are an integrated unitary structure and the at least one second frame member and the second seat member are an integrated unitary structure.

10. The car seat of claim 4, wherein the at least one first frame member is a vertically oriented plate.

11. The car seat of claim 4, wherein the at least one first frame member is of an L-shaped configuration.

12. The car seat of claim 4, wherein the at least one first frame member is made of steel.

13. The car seat of claim 1, wherein the bottom edge of the first seat member is chamfered toward the rear face thereof.

14. The car seat of claim 1, wherein the first seat member is of a L-shaped configuration with a vertical portion, having the top edge, and a horizontal portion, having the bottom edge.

15. The car seat of claim 1, wherein the pivot means has an axis of rotation that is behind the front face of the first seat member.

16. The car seat of claim 1, the pivot means has an axis of rotation that is behind the front face of the second seat member.

17. The car seat of claim 1, wherein the axis location of the pivot means is tangent to the front face of the first seat member.

18. The car seat of claim 1, wherein the axis location of the pivot means is tangent to the front face of the second seat member.

19. The car seat of claim 1, further comprising:
at least one protrusion emanating upwardly from the second surface of the second seat member.

20. The car seat of claim 1 wherein the second seat member includes a surface with a center region and side regions; the center region being lower relative to the side regions.

21. The car seat of claim 1, further comprising:
a support member located proximal to the bottom edge of the first seat member and at a distance from the front face of the first seat member.

22. The car seat of claim 1, further comprising:
a support member located proximal to the bottom edge of the first seat member and at a distance from the front face of the first seat member; the second seat member being pivotable between a closed position and an open position with the second seat member being in communication with the support member.

23. A car seat, comprising:
a first seat member;
a second seat member at an angle relative to the first seat member; each of the first seat member and the second seat member having a top edge, bottom edge, side edges and a front face and a rear face;
pivot means connected to the first seat member proximal to the bottom edge thereof; the pivot means being positioned a selected distance from the bottom edge thereof;
the second seat member being pivotable between a closed position with the front face of the second seat member being in close proximity to the front face of the first seat member and an open position;
a pair of armrests emanating from the second seat member; and
wherein the first seat member further defines a pair of recesses into the front face of the first seat member; the pair of armrests being respectively receivable into the pair of recesses upon pivoting of the second seat member into a closed position to provide a compact folded car seat.

24. The car seat of claim 23, wherein the pair of armrests are hingedly connected to the second seat member.

25. The car seat of claim 23, wherein the pair of armrests are removable.

26. The car seat of claim 23, wherein the first seat member further defines a pair of apertures through the front face of the first seat member; the pair of armrests being respectively receivable into the pair of apertures upon pivoting of the second seat member into a closed position to provide a compact folded car seat.

27. A car seat, comprising:
a seat back member having a top edge, bottom edge, side edges and a front face and a rear face;
pivot means connected to the seat back member; the pivot means being positioned a selected distance from the bottom edge;
a support member located proximal to the bottom edge of the seat back member; and
a seat bottom member, having a first surface and a second surface, pivotally connected to the seat back member via the pivot means; the seat bottom member being pivotable between a closed position with the first surface of the seat bottom member being in close proximity to the front face of the seat back member and an open position with the second surface of the seat bottom member being in communication with the support member; and
wherein the seat back member defines at least one slot therein; the seat bottom member being respectively movable through the at least one slot upon pivoting of the seat bottom member relative to the seat back member.

28. The car seat of claim 27 whereby in the open position, the point of
communication between the second surface of the seat bottom member and the support member is a distance of more than one inch from the axis location of the pivot means.

29. The car seat of claim 27, further comprising:
means for maintaining the seat bottom member in the open position.

30. The car seat of claim 27, further comprising:
at least one bottom frame member connected to the seat bottom member; the at least one bottom frame member connected to the pivot means attached to the seat back member.

31. The car seat of claim 30, further comprising:
at least one back frame member connected to the seat back member; the at least one back frame member being connected to the pivot means attached to the seat back member.

32. The car seat of claim 31, wherein the seat back member defines a surface and the seat bottom member defines a surface; pivoting of the seat back member relative to the seat bottom member enables one surface to intersect through the other surface.

33. The car seat of claim 31, wherein the at least one back frame member is a vertically oriented plate.

34. The car seat of claim 31, wherein the at least one back frame member is of an L-shaped configuration.

35. The car seat of claim 31, wherein the at least one back frame member is made of steel.

36. The car seat of claim 31, wherein the at least one back frame member and the seat back member are an integrated unitary structure and the at least one bottom frame member and the seat bottom member are an integrated unitary structure.

37. The car seat of claim 30, wherein the at least one bottom frame member is a vertically oriented plate.

38. The car seat of claim 30, wherein the at least one bottom frame member is of an L-shaped configuration.

39. The car seat of claim 30, wherein the at least one bottom frame member is made of steel.

40. The car seat of claim 27, further comprising:
a pair of armrests emanating from the first surface of the seat bottom member.

41. The car seat of claim 40, wherein the pair of armrests are hingedly connected to the seat bottom member.

42. The car seat of claim 40, wherein the pair of armrests are removable.

43. The car seat of claim 40, wherein the seat back member further defines a pair of recesses into the front face of the seat back member; the pair of armrests being respectively receivable into the pair of recesses upon pivoting of the seat bottom member into a closed position to provide a compact folded car seat.

44. The car seat of claim 40, wherein the seat back member further defines a pair of apertures through the front face of the seat back member; the pair of armrests being respectively receivable into the pair of apertures upon pivoting of the seat bottom member into a closed position to provide a compact folded car seat.

45. The car seat of claim 27, wherein the bottom edge of the seat back member is chamfered toward the rear face thereof.

46. The car seat of claim 27, wherein the seat back member is of a L-shaped configuration with a vertical portion, having the top edge, and a horizontal portion, having the bottom edge.

47. A folding seat, comprising:
a first array of vertically oriented plate members in spaced apart relation to one another forming a first frame having a bottom end with a support surface thereon and a top end;
a second array of vertically oriented plate members in spaced apart relation to one another forming a second frame; the second frame being pivotally connected to the first frame at a location between the bottom end and the top end; the support surface of the bottom end being a pivot stop thereby defining an open condition of the second frame relative to the first frame; complete pivoting of the second frame toward the first frame thereby defining a closed condition;
a first cover positioned over the first frame;
a second cover positioned over the second frame;
the first cover including a plurality of slots therein; the second array of vertically oriented plate members being respectively pivotally received in the slots to permit compact folding of the second cover towards the first cover; and
whereby the second frame and the second cover thereon being pivotable between an open condition and a closed position to provide a compact folding car seat.

48. The folding seat of claim 47, further comprising:
means for releasably securing the second frame to the support surface.

49. The folding seat of claim 47, wherein the first array of vertically oriented plate members are of a substantially L-shaped configuration with a substantially L-shaped cover thereon.

50. The car seat of claim 49, wherein the second frame and the second cover are an integrated unitary structure and the first frame and the first cover are an integrated unitary structure.

51. The folding seat of claim 47, wherein the second cover includes a pair of armrests emanating upwardly therefrom.

52. The folding seat of claim 51, wherein the first cover defines a pair of recesses therein; the pair of armrests being respectively receivable in the pair of recesses upon pivoting of the second cover toward the first cover.

53. The folding seat of claim 47, wherein the first array of vertically oriented plate members and the second array of vertically oriented plate members are made of steel.

54. The folding seat of claim 47 wherein the second cover and the first cover are made of plastic.

55. A car seat, comprising:
a seat back member having a top edge, bottom edge, side edges and a front face and a rear face;
pivot means connected to the seat back member; the pivot means being
positioned a selected distance from the bottom edge;
at least one back frame member connected to the seat back member; the at least one back frame member being connected to the pivot means attached to the seat back member;
a seat bottom member, having a first surface and a second surface, pivotally connected to the seat back member via the pivot means; the seat bottom member being pivotable between a closed position with the first surface of the seat bottom member being in close proximity to the front face of the seat back member and an open position; and
wherein the seat back member defines at least one slot therein; the at least one bottom frame member being respectively movable through the at least one slot upon pivoting of the seat bottom member relative to the seat back member.

56. The car seat of claim 55, further comprising:
means for maintaining the seat bottom member in the open position.

57. The car seat of claim 55, further comprising:
at least one bottom frame member connected to the seat bottom member; the at least one bottom frame member connected to the pivot means attached to the seat back member.

58. The car seat of claim 57, wherein the at least one bottom frame member is a vertically oriented plate.

59. The car seat of claim 57, wherein the at least one bottom frame member is of an L-shaped configuration.

60. The car seat of claim 57, wherein the at least one bottom frame member is made of steel.

61. The car seat of claim 57, wherein the at least one bottom frame member and the seat bottom member are an integrated unitary structure and the at least one back frame member and the seat bottom member are an integrated unitary structure.

62. The car seat of claim 55, further comprising:
a pair of armrests emanating from the seat bottom member.

63. The car seat of claim 62, wherein the pair of armrests are hingedly connected to the seat bottom member.

64. The car seat of claim 62, wherein the pair of armrests are removable.

65. The car seat of claim 62, wherein the seat back member further defines a pair of recesses into the front face of the seat back member; the pair of armrests being respectively receivable into the pair of recesses upon pivoting of the seat bottom member into a closed position to provide a compact folded car seat.

66. The car seat of claim 62, wherein the seat back member further defines a pair of apertures through the front face of the seat back member; the pair of armrests being respectively receivable into the pair of apertures upon pivoting of the seat bottom member into a closed position to provide a compact folded car seat.

67. The car seat of claim 55, wherein the at least one back frame member is a vertically oriented plate.

68. The car seat of claim 55, wherein the bottom edge of the seat back member is chamfered toward the rear face thereof.

69. The car seat of claim 55, wherein the seat back member is of a L-shaped configuration with a vertical portion, having the top edge, and a horizontal portion, having the bottom edge.

70. The car seat of claim 55, wherein the at least one back frame member is of an L-shaped configuration.

71. The car seat of claim 55, wherein the at least one back frame member is made of steel.

72. A car seat, comprising:
a first seat member;
a second seat member at an angle relative to the first seat member; each of the first seat member and the second seat member having a top edge, bottom edge, side edges and a front face and a rear face;
pivot means connected to the first seat member proximal to the bottom edge; the pivot means being positioned a selected distance from the bottom edge;
at least one first frame member connected to the first seat member; the at least
one first frame member connected to the pivot means attached to the second seat member;
at least one second frame member connected to the second seat member; the at least one second frame member being connected to the pivot means attached to the first seat member;
the first seat member defining at least one slot therein; the at least one second frame member being movable through the at least one slot upon pivoting of the second seat member relative to the first seat member; and
the second seat member being pivotable to a closed position with the front face of the second seat member being in close proximity to the front face of the first seat member.

73. The car seat of claim 72, further comprising:
means for maintaining the first seat member in the open position relative to the second seat member.

74. The car seat of claim 72, wherein the first seat member defines a first surface and the second seat member defines a second surface; pivoting of the first seat member relative to the second seat member enables the first surface to intersect through the second surface.

75. The car seat of claim 72, further comprising:
a pair of armrests emanating from the second seat member.

76. The car seat of claim 75, wherein the pair of armrests are hingedly connected to the second seat member.

77. The car seat of claim 75, wherein the pair of armrests are removable.

78. The car seat of claim 75, wherein the first seat member further defines a pair of recesses into the front face of the first seat member; the pair of armrests being respectively receivable into the pair of recesses upon pivoting of the second seat member into a closed position to provide a compact folded car seat.

79. The car seat of claim 75, wherein the first seat member further defines a pair of apertures through the front face of the seat back member; the pair of armrests being respectively receivable into the pair of apertures upon pivoting of the second seat member into a closed position to provide a compact folded car seat.

80. The car seat of claim 72, wherein the at least one first frame member is a vertically oriented plate.

81. The car seat of claim 72, wherein the at least one second frame member is a vertically oriented plate.

82. The car seat of claim 72, wherein the bottom edge of the first seat member is chamfered toward the rear face thereof.

83. The car seat of claim 72, wherein the first seat member is of a L-shaped configuration with a vertical portion, having the top edge, and a horizontal portion, having the bottom edge.

84. The car seat of claim 72, wherein the at least one first frame member is of an L-shaped configuration.

85. The car seat of claim 72, wherein the at least one second frame member is of an L-shaped configuration.

86. The car seat of claim 72, wherein the at least one first frame member is made of steel.

87. The car seat of claim 72, wherein the at least one second first frame member is made of steel.

88. The car seat of claim 72, wherein the pivot means has an axis of rotation that is behind the front face of the first seat member.

89. The car seat of claim 72, the pivot means has an axis of rotation that is behind the front face of the second seat member.

90. The car seat of claim 72, wherein the axis location of the pivot means is tangent to the front face of the first seat member.

91. The car seat of claim 72, wherein the axis location of the pivot means is tangent to the front face of the second seat member.

92. The car seat of claim 72, wherein the at least one first frame member and the first seat member are an integrated unitary structure and the at least one second frame member and the second seat member are an integrated unitary structure.

93. A car seat, comprising:
a first seat member;
a second seat member at an angle relative to the first seat member; each of the
first seat member and the second seat member having a top edge, bottom edge, side edges and a front face and a rear face;
pivot means connected to the first seat member proximal to the bottom edge thereof; the pivot means being positioned a selected distance from the bottom edge thereof;
a support member located proximal to the bottom edge of the first seat member and at a distance from the front face of the first seat member;
at least one first frame member connected to the first seat member; the at least one first frame member pivotally connected to the pivot means attached to the second seat member;
at least one second frame member connected to the second seat member; the at least one second frame member being connected to the pivot means attached to the first seat member;
the first seat member defines at least one slot therein; the at least one second frame member being movable through the at least one slot upon pivoting of the second seat member relative to the first seat member; and
the second seat member being pivotable between a closed position and an open position.

94. The car seat of claim 93 whereby in the open position, the point of communication between the rear face of the second seat member and the support member is a distance of more than one inch from the axis location of the pivot means.

95. The car seat of claim 93, further comprising:
means for maintaining the first seat member in an open position relative to the second seat member.

96. The car seat of claim 93, wherein the first seat member defines a first surface and the second seat member defines a second surface; pivoting of the first seat member relative to the second seat member enables the first surface to intersect through the second surface.

97. The car seat of claim 93, wherein the at least one first frame member and the first seat member are an integrated unitary structure and the at least one second frame member and the second seat member are an integrated unitary structure.

98. The car seat of claim 93, further comprising:
a pair of armrests emanating from the second seat member.

99. The car seat of claim 98, wherein the pair of armrests are hingedly connected to the second seat member.

100. The car seat of claim 98, wherein the pair of armrests are removable.

101. The car seat of claim 98, wherein the first seat member further defines a pair of recesses into the front face of the first seat member; the pair of armrests being respectively receivable into the pair of recesses upon pivoting of the second seat member into a closed position to provide a compact folded car seat.

102. The car seat of claim 98, wherein the first seat member further defines a pair of apertures through the front face of the first seat member; the pair of armrests being respectively receivable into the pair of apertures upon pivoting of the second seat bottom member into a closed position to provide a compact folded car seat.

103. The car seat of claim 93, wherein the at least one first frame member is a vertically oriented plate.

104. The car seat of claim 93, wherein the at least one second frame member is a vertically oriented plate.

105. The car seat of claim 93, wherein the bottom edge of the first seat member is chamfered toward the rear face thereof.

106. The car seat of claim 93, wherein the first seat member is of a L-shaped configuration with a vertical portion, having the top edge, and a horizontal portion, having the bottom edge.

107. The car seat of claim 93, wherein the at least one first frame member is of an L-shaped configuration.

108. The car seat of claim 93, wherein the at least one second frame member is of an L-shaped configuration.

109. The car seat of claim 93, wherein the at least one first frame member is made of steel.

110. The car seat of claim 93, wherein the at least one second frame member is made of steel.

111. The car seat of claim 93, wherein the pivot means has an axis of rotation that is behind the front face of the first seat member.

112. The car seat of claim 93, the pivot means has an axis of rotation that is behind the front face of the second seat member.

113. The car seat of claim 93, wherein the axis location of the pivot means is tangent to the front face of the first seat member.

114. The car seat of claim 93, wherein the axis location of the pivot means is tangent to the front face of the second seat member.

* * * * *